United States Patent
Yang et al.

(10) Patent No.: US 10,993,190 B2
(45) Date of Patent: Apr. 27, 2021

(54) POWER CONTROL FOR SPATIAL MULTIPLEXING OF UPLINK CHANNELS

(71) Applicant: QUALCOMM Incorporated, San Diego, CA (US)

(72) Inventors: Wei Yang, San Diego, CA (US); Yi Huang, San Diego, CA (US); Xiao Feng Wang, San Diego, CA (US); Alexandros Manolakos, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 16/440,711

(22) Filed: Jun. 13, 2019

(65) Prior Publication Data
US 2019/0387481 A1 Dec. 19, 2019

(30) Foreign Application Priority Data

Jun. 15, 2018 (GR) .............................. 20180100262

(51) Int. Cl.
*H04W 52/18* (2009.01)
(52) U.S. Cl.
CPC .................................. *H04W 52/18* (2013.01)
(58) Field of Classification Search
None
See application file for complete search history.

(56) References Cited

U.S. PATENT DOCUMENTS

| | | | |
|---|---|---|---|
| 2011/0287804 A1 | 11/2011 | Seo et al. | |
| 2013/0058315 A1 | 3/2013 | Feuersaenger et al. | |
| 2013/0272257 A1* | 10/2013 | Takaoka | H04B 7/0447 370/329 |
| 2014/0369324 A1* | 12/2014 | Lin | H04W 52/146 370/336 |
| 2018/0139701 A1* | 5/2018 | Wang | H04W 52/367 |
| 2020/0083939 A1* | 3/2020 | Park | H04W 80/08 |

FOREIGN PATENT DOCUMENTS

EP 3035749 A1 6/2016

OTHER PUBLICATIONS

International Search Report and Written Opinion—PCT/US2019/037185—ISA/EPO—dated Sep. 25, 2019.

* cited by examiner

*Primary Examiner* — Saumit Shah
(74) *Attorney, Agent, or Firm* — Harrity & Harrity, LLP

(57) ABSTRACT

Various aspects of the present disclosure generally relate to wireless communication. In some aspects, a user equipment may determine that multiple uplink channels are to be transmitted contemporaneously via different antennas on a component carrier. The user equipment may determine a respective transmit power for multiple uplink communications associated with the multiple uplink channels based at least in part on a set of priority rules that identifies a respective priority for the multiple uplink communications. The user equipment may transmit the multiple uplink communications using the respective transmit power. Numerous other aspects are provided.

30 Claims, 14 Drawing Sheets

POWER CONTROL FOR SPATIAL MULTIPLEXING OF UPLINK CHANNELS

CROSS-REFERENCE TO RELATED APPLICATION(S)

This application claims priority to Greek Patent Application No. 20180100262, filed on Jun. 15, 2018, entitled "TECHNIQUES AND APPARATUSES FOR POWER CONTROL FOR SPATIAL MULTIPLEXING OF UPLINK CHANNELS," which is hereby expressly incorporated by reference herein.

FIELD OF THE DISCLOSURE

Aspects of the present disclosure generally relate to wireless communication and to techniques and apparatuses for power control for spatial multiplexing of uplink channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that multiple uplink channels are to be transmitted contemporaneously via different antennas on a component carrier. The method may include determining a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, wherein a total transmit power to be used for the multiple uplink communications satisfies a maximum transmit power of the UE. The method may include determining whether a power reduction is needed for the respective transmit power based at least in part on determining the respective transmit power for the multiple uplink communications. The method may include transmitting the multiple uplink communications using the respective transmit power based at least in part on determining whether the power reduction is needed.

In some aspects, a user equipment for wireless communication may include memory and one or more processors operatively coupled to the memory. The memory and the one or more processors may be configured to determine that multiple uplink channels are to be transmitted contemporaneously via different antennas on a component carrier. The memory and the one or more processors may be configured to determine a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, wherein a total transmit power to be used for the multiple uplink communications satisfies a maximum transmit power of the UE. The memory and the one or more processors may be configured to determine whether a power reduction is needed for the respective transmit power based at least in part on determining the respective transmit power for the multiple uplink communications. The memory and the one or more processors may be configured to transmit the multiple uplink communications using the respective transmit power based at least in part on determining whether the power reduction is needed.

In some aspects, a non-transitory computer-readable medium may store one or more instructions for wireless communication. The one or more instructions, when executed by one or more processors of a user equipment, may cause the one or more processors to determine that multiple uplink channels are to be transmitted contemporaneously via different antennas on a component carrier. The one or more instructions, when executed by one or more processors of a user equipment, may cause the one or more processors to determine a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, wherein a total transmit power to be used for the multiple uplink communications satisfies a maximum transmit power of the UE. The one or more instructions, when executed by one or more processors of a user equipment, may cause the one or more processors to determine whether a power reduction is needed for the respective transmit power based at least in part on determining the respective transmit power for the multiple uplink communications. The one or more instructions, when executed by one or more processors of a user equipment, may cause the one or more processors to transmit the multiple uplink communications using the respective transmit power based at least in part on determining whether the power reduction is needed.

In some aspects, an apparatus for wireless communication may include means for determining that multiple uplink channels are to be transmitted contemporaneously via different antennas on a component carrier. The apparatus may include means for determining a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, wherein a total transmit power to be used for the multiple uplink communications satisfies a maximum transmit power of the apparatus. The apparatus may include means for determining whether a power reduction is needed for the respective transmit power based at least in part on determining the respective transmit power for the multiple uplink communications. The apparatus may include means for transmitting the multiple uplink communications using the respective transmit power based at least in part on determining whether the power reduction is needed.

In some aspects, a method of wireless communication, performed by a base station (BS), may include determining that multiple uplink channels are to be transmitted contemporaneously via different antennas on a component carrier. The method may include determining a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, wherein a total transmit power to be used for the multiple uplink communications satisfies a maximum transmit power of a user equipment (UE). The method may include determining whether a power reduction is needed for the respective transmit power based at least in part on determining the respective transmit power for the multiple uplink communications. The method may include transmitting, to the UE, information that identifies the respective transmit power that the UE is to use to transmit the multiple uplink communications based at least in part on determining whether the power reduction is needed.

In some aspects, a base station for wireless communication may include memory and one or more processors operatively coupled to the memory. The memory and the one or more processors may be configured to determine that multiple uplink channels are to be transmitted contemporaneously via different antennas on a component carrier. The memory and the one or more processors may be configured to determine a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, wherein a total transmit power to be used for the multiple uplink communications satisfies a maximum transmit power of a UE. The memory and the one or more processors may be configured to determine whether a power reduction is needed for the respective transmit power based at least in part on determining the respective transmit power for the multiple uplink communications. The memory and the one or more processors may be configured to transmit, to the UE, information that identifies the respective transmit power that the UE is to use to transmit the multiple uplink communications based at least in part on determining whether the power reduction is needed.

In some aspects, a non-transitory computer-readable medium may store one or more instructions for wireless communication. The one or more instructions, when executed by one or more processors of a base station, may cause the one or more processors to determine that multiple uplink channels are to be transmitted contemporaneously via different antennas on a component carrier. The one or more instructions, when executed by one or more processors of a base station, may cause the one or more processors to determine a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, wherein a total transmit power to be used for the multiple uplink communications satisfies a maximum transmit power of a UE. The one or more instructions, when executed by one or more processors of a base station, may cause the one or more processors to determine whether a power reduction is needed for the respective transmit power based at least in part on determining the respective transmit power for the multiple uplink communications. The one or more instructions, when executed by one or more processors of a base station, may cause the one or more processors to transmit, to the UE, information that identifies the respective transmit power that the UE is to use to transmit the multiple uplink communications based at least in part on determining whether the power reduction is needed In some aspects, an apparatus for wireless communication may include means for determining that multiple uplink channels are to be transmitted contemporaneously via different antennas on a component carrier. The apparatus may include means for determining a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, wherein a total transmit power to be used for the multiple uplink communications satisfies a maximum transmit power of a UE. The apparatus may include means for determining whether a power reduction is needed for the respective transmit power based at least in part on determining the respective transmit power for the multiple uplink communications. The apparatus may include means for transmitting, to the UE, information that identifies the respective transmit power that the UE is to use to transmit the multiple uplink communications based at least in part on determining whether the power reduction is needed.

In some aspects, a method of wireless communication, performed by a UE, may include determining that multiple uplink channels are to be transmitted contemporaneously via different antennas on a component carrier. The method may include determining a respective transmit power for multiple uplink communications associated with the multiple channels based at least in part on determining that the multiple uplink channels are to be transmitted contemporaneously via the different antennas on the component carrier and based at least in part on a quantity of channels that the UE is scheduled to transmit, wherein a respective transmission of the multiple uplink communications is scheduled to overlap on at least one OFDM symbol, wherein a total transmit power to be used for the multiple uplink communications satisfies a maximum transmit power of the UE. The method may include determining whether a power reduction is needed for the respective transmit power based at least in part on determining the respective transmit power for the multiple uplink communications. The method may include transmitting the multiple uplink communications using the respective transmit power based at least in part on determining whether the power reduction is needed.

In some aspects, a user equipment for wireless communication may include memory and one or more processors operatively coupled to the memory. The memory and the one or more processors may be configured to determine that multiple uplink channels are to be transmitted contemporaneously via different antennas on a component carrier. The memory and the one or more processors may be configured to determine a respective transmit power for multiple uplink communications associated with the multiple channels based at least in part on determining that the multiple uplink channels are to be transmitted contemporaneously via the different antennas on the component carrier and based at least in part on a quantity of channels that the UE is scheduled to transmit, wherein a respective transmission of the multiple uplink communications is scheduled to overlap on at least one OFDM symbol, wherein a total transmit power to be used for the multiple uplink communications satisfies a maximum transmit power of the UE. The memory and the one or more processors may be configured to determine whether a power reduction is needed for the respective transmit power based at least in part on determining the respective transmit power for the multiple uplink communications. The memory and the one or more processors may be configured to transmit the multiple uplink communications using the respective transmit power based at least in part on determining whether the power reduction is needed.

In some aspects, a non-transitory computer-readable medium may store one or more instructions for wireless communication. The one or more instructions, when executed by one or more processors of a user equipment, may cause the one or more processors to determine that multiple uplink channels are to be transmitted contemporaneously via different antennas on a component carrier. The one or more instructions, when executed by one or more processors of a user equipment, may cause the one or more processors to determine a respective transmit power for multiple uplink communications associated with the multiple channels based at least in part on determining that the multiple uplink channels are to be transmitted contemporaneously via the different antennas on the component carrier and based at least in part on a quantity of channels that the UE is scheduled to transmit, wherein a respective transmission of the multiple uplink communications is scheduled to overlap on at least one orthogonal OFDM symbol, wherein a total transmit power to be used for the multiple uplink communications satisfies a maximum transmit power of the UE. The one or more instructions, when executed by one or more processors of a user equipment, may cause the one or more processors to determine whether a power reduction is needed for the respective transmit power based at least in part on determining the respective transmit power for the multiple uplink communications. The one or more instructions, when executed by one or more processors of a user equipment, may cause the one or more processors to transmit the multiple uplink communications using the respective transmit power based at least in part on determining whether the power reduction is needed.

In some aspects, an apparatus for wireless communication may include means for determining that multiple uplink channels are to be transmitted contemporaneously via different antennas on a component carrier. The apparatus may include means for determining a respective transmit power for multiple uplink communications associated with the multiple channels based at least in part on determining that the multiple uplink channels are to be transmitted contemporaneously via the different antennas on the component carrier and based at least in part on a quantity of channels that the apparatus is scheduled to transmit, wherein a respective transmission of the multiple uplink communications is scheduled to overlap on at least one OFDM symbol, wherein a total transmit power to be used for the multiple uplink communications satisfies a maximum transmit power of the apparatus. The apparatus may include means for determining whether a power reduction is needed for the respective transmit power based at least in part on determining the respective transmit power for the multiple uplink communications. The apparatus may include means for transmitting the multiple uplink communications using the respective transmit power based at least in part on determining whether the power reduction is needed.

In some aspects, a method of wireless communication, performed by a BS, may include determining that multiple uplink channels are to be transmitted contemporaneously via different antennas on a component carrier. The method may include determining a respective transmit power for multiple uplink communications associated with the multiple channels based at least in part on determining that the multiple uplink channels are to be transmitted contemporaneously via the different antennas on the component carrier and based at least in part on a quantity of channels that a UE is scheduled to transmit, wherein a respective transmission of the multiple uplink communications is scheduled to overlap on at least one OFDM symbol, wherein a total transmit power to be used for the multiple uplink communications satisfies a maximum transmit power of the UE. The method may include determining whether a power reduction is needed for the respective transmit power based at least in part on determining the respective transmit power for the multiple uplink communications. The method may include transmitting, to the UE, information to cause the UE to transmit the multiple uplink communications using the respective transmit power based at least in part on determining whether the power reduction is needed.

In some aspects, a base station for wireless communication may include memory and one or more processors operatively coupled to the memory. The memory and the one or more processors may be configured to determine that multiple uplink channels are to be transmitted contemporaneously via different antennas on a component carrier. The memory and the one or more processors may be configured to determine a respective transmit power for multiple uplink communications associated with the multiple channels based at least in part on determining that the multiple uplink channels are to be transmitted contemporaneously via the different antennas on the component carrier and based at least in part on a quantity of channels that a user equipment (UE) is scheduled to transmit, wherein a respective transmission of the multiple uplink communications is scheduled to overlap on at least one OFDM symbol, wherein a total transmit power to be used for the multiple uplink communications satisfies a maximum transmit power of the UE. The memory and the one or more processors may be configured to determine whether a power reduction is needed for the respective transmit power based at least in part on determining the respective transmit power for the multiple uplink communications. The memory and the one or more processors may be configured to transmit, to the UE, information to cause the UE to transmit the multiple uplink communications using the respective transmit power based at least in part on determining whether the power reduction is needed.

In some aspects, a non-transitory computer-readable medium may store one or more instructions for wireless communication. The one or more instructions, when executed by one or more processors of a base station, may cause the one or more processors to determine that multiple uplink channels are to be transmitted contemporaneously via different antennas on a component carrier. The one or more instructions, when executed by one or more processors of a base station, may cause the one or more processors to determine a respective transmit power for multiple uplink communications associated with the multiple channels based at least in part on determining that the multiple uplink channels are to be transmitted contemporaneously via the different antennas on the component carrier and based at least in part on a quantity of channels that a UE is scheduled to transmit, wherein a respective transmission of the multiple uplink communications is scheduled to overlap on at least one OFDM symbol, wherein a total transmit power to be used for the multiple uplink communications satisfies a maximum transmit power of the UE. The one or more instructions, when executed by one or more processors of a base station, may cause the one or more processors to determine whether a power reduction is needed for the respective transmit power based at least in part on determining the respective transmit power for the multiple uplink communications. The one or more instructions, when executed by one or more processors of a base station, may cause the one or more processors to transmit, to the UE, information to cause the UE to transmit the multiple uplink communications using the respective transmit power based at least in part on determining whether the power reduction is needed.

In some aspects, an apparatus for wireless communication may include means for determining that multiple uplink channels are to be transmitted contemporaneously via different antennas on a component carrier. The apparatus may include means for determining a respective transmit power for multiple uplink communications associated with the multiple channels based at least in part on determining that the multiple uplink channels are to be transmitted contemporaneously via the different antennas on the component carrier and based at least in part on a quantity of channels that a UE is scheduled to transmit, wherein a respective transmission of the multiple uplink communications is scheduled to overlap on at least one orthogonal frequency division multiplexing (OFDM) symbol, wherein a total transmit power to be used for the multiple uplink communications satisfies a maximum transmit power of the UE. The apparatus may include means for determining whether a power reduction is needed for the respective transmit power based at least in part on determining the respective transmit power for the multiple uplink communications. The apparatus may include means for transmitting, to the UE, information to cause the UE to transmit the multiple uplink communications using the respective transmit power based at least in part on determining whether the power reduction is needed.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
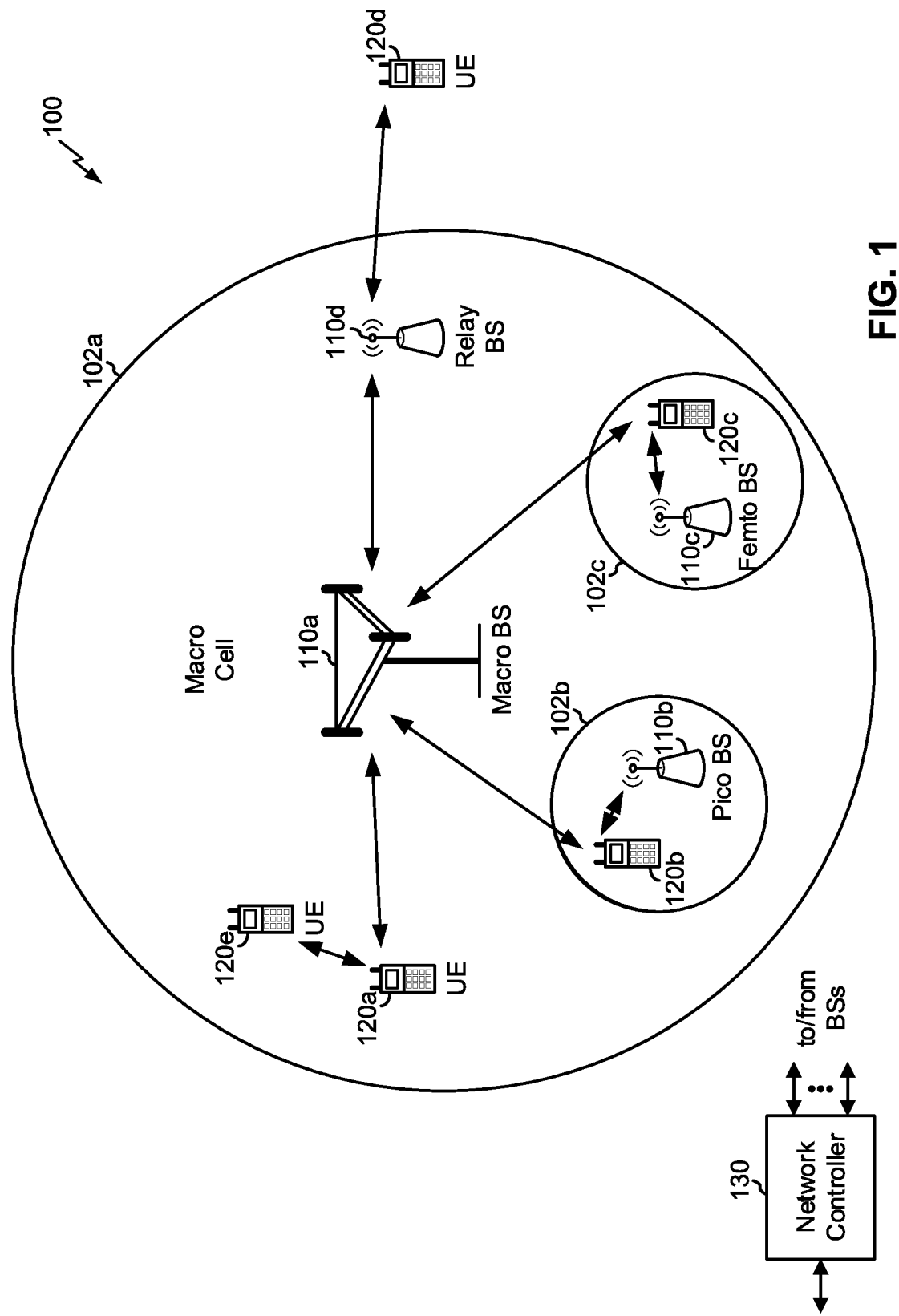
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120c) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
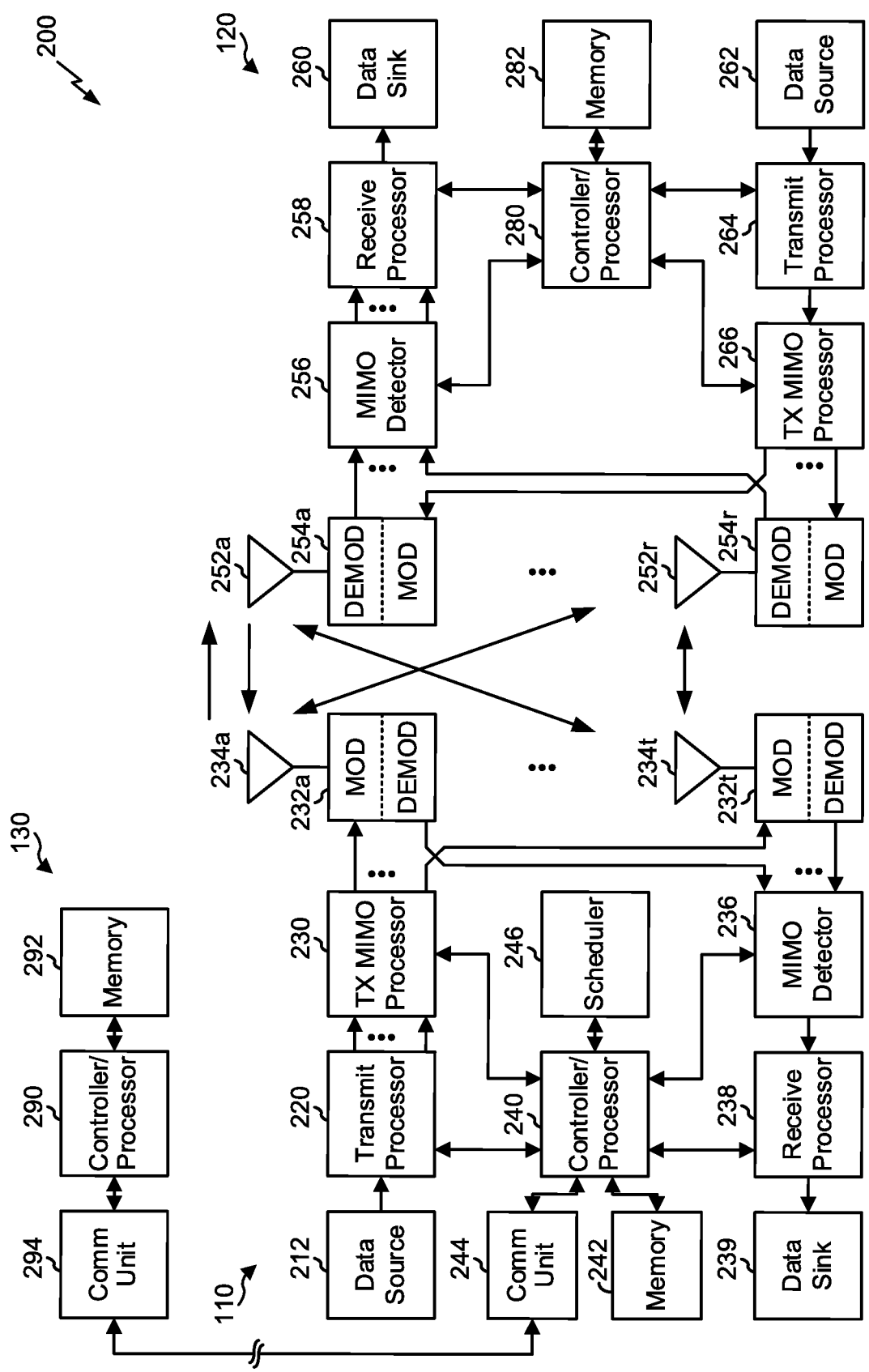
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with power control for spatial multiplexing of uplink channels, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that multiple uplink channels are to be transmitted contemporaneously via different antennas on a component carrier, means for determining a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, means for determining whether a power reduction is needed for the respective transmit power based at least in part on determining the respective transmit power for the multiple uplink communications, means for transmitting the multiple uplink communications using the respective transmit power based at least in part on determining whether the power reduction is needed, and/or the like. In some aspects, such means may include one or more components of UE 120 described in connection with FIG. 2.

In some aspects, base station 110 may include means for determining that multiple uplink channels are to be transmitted contemporaneously via different antennas on a component carrier, means for determining a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, means for determining whether a power reduction is needed for the respective transmit power based at least in part on determining the respective transmit power for the multiple uplink communications, means for transmitting, to the UE, information that identifies the respective transmit power that the UE is to use to transmit the multiple uplink communications based at least in part on determining whether the power reduction is needed, and/or the like. In some aspects, such means may include one or more components of base station 110 described in connection with FIG. 2.

In some aspects, UE 120 may include means for determining that multiple uplink channels are to be transmitted contemporaneously via different antennas on a component carrier, means for determining a respective transmit power for multiple uplink communications associated with the multiple channels based at least in part on determining that the multiple uplink channels are to be transmitted contemporaneously via the different antennas on the component carrier and based at least in part on a quantity of channels that the UE is scheduled to transmit, means for determining whether a power reduction is needed for the respective transmit power based at least in part on determining the respective transmit power for the multiple uplink communications, means for transmitting the multiple uplink communications using the respective transmit power based at least in part on determining whether the power reduction is needed, and/or the like. In some aspects, such means may include one or more components of UE 120 described in connection with FIG. 2.

In some aspects, base station 110 may include means for determining that multiple uplink channels are to be transmitted contemporaneously via different antennas on a component carrier, means for determining a respective transmit power for multiple uplink communications associated with the multiple channels based at least in part on determining that the multiple uplink channels are to be transmitted contemporaneously via the different antennas on the component carrier and based at least in part on a quantity of channels that a user equipment (UE) is scheduled to transmit, means for determining whether a power reduction is needed for the respective transmit power based at least in part on determining the respective transmit power for the multiple uplink communications, means for transmitting, to the UE, information to cause the UE to transmit the multiple uplink communications using the respective transmit power based at least in part on determining whether the power reduction is needed, and/or the like. In some aspects, such means may include one or more components of base station 110 described in connection with FIG. 2.

As indicated above, FIG. 2 is provided as an example. Other examples may differ from what is described with regard to FIG. 2.

Figure 3:
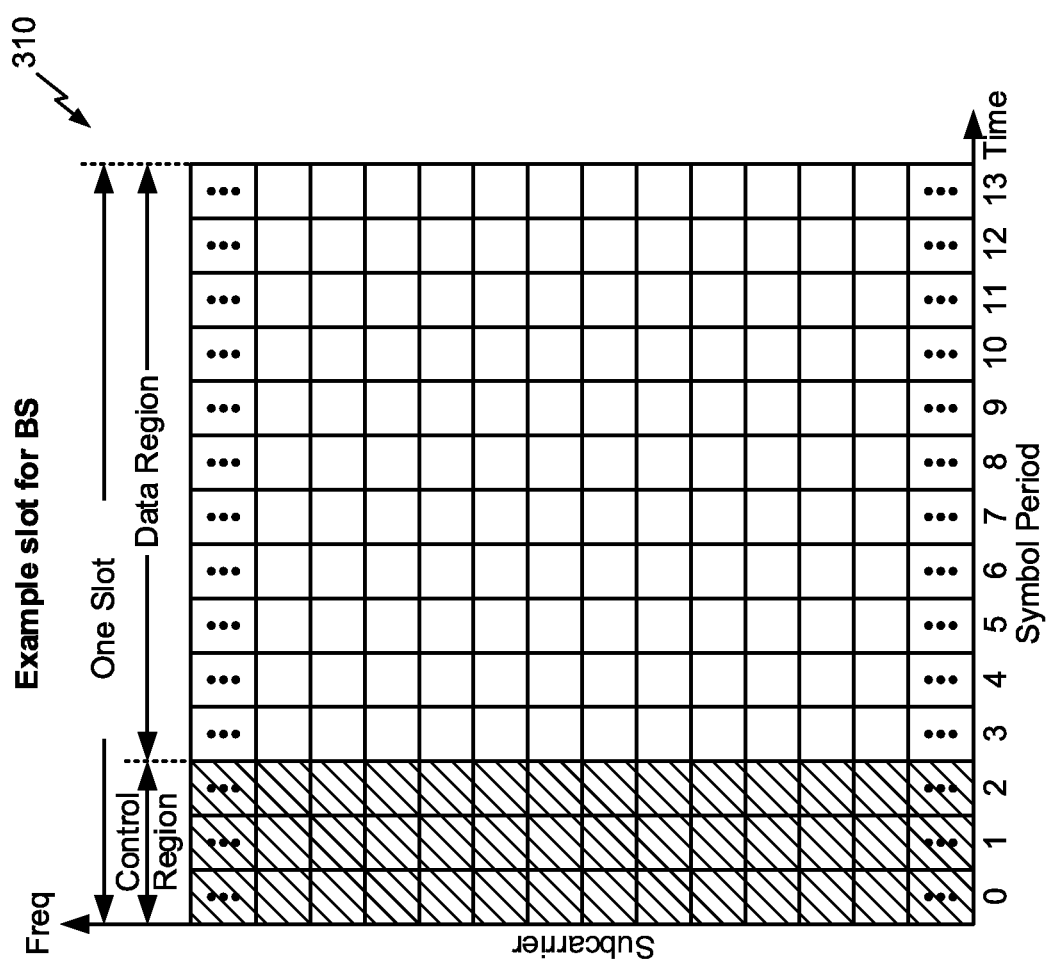
FIG. 3 is a block diagram conceptually illustrating an example slot format with a normal cyclic prefix, in accordance with various aspects of the present disclosure.

FIG. 3 shows an example slot format 310 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for frequency division duplexing in certain telecommunications systems (e.g., NR). For example, Q interlaces with indices of 0 through Q–1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. NR may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

As indicated above, FIG. 3 is provided as an example. Other examples may differ from what is described with regard to FIG. 3.

A UE may have multiple transmit antennas and/or transmit chains, which may allow the UE to transmit multiple uplink communications and/or channels (e.g., channels (e.g., physical uplink shared channel (PUSCH) communications, physical uplink control channel (PUCCH) communications, sounding reference signals (SRSs), physical random access channel (PRACH) communications, and/or the like) to a BS on different antennas using spatial multiplexing.

While this may provide the UE with the capability to transmit multiple uplink communications and/or channels contemporaneously (e.g., overlapping on at least one resource block), this capability may be constrained. For example, the UE may be limited in the maximum amount of transmit power that the UE can use at a given time (e.g., a maximum transmit power), such that the UE cannot use more than the maximum transmit power when transmitting multiple uplink communications and/or channels.

In some cases, a total scheduled transmit power for the multiple uplink communications and/or channels may exceed the maximum transmit power of the UE when the multiple uplink communications are scheduled to overlap on at least one resource block. For example, a first scheduled transmit power for a first uplink communication and/or channel and a second scheduled transmit power for a second uplink communication and/or channel may exceed the maximum transmit power of the UE on overlapping resource blocks. As a result, the UE may not be capable of transmitting one or more of the multiple uplink communications and/or channels at a scheduled transmit power based at least in part on a total scheduled transmit power for the multiple uplink communications and/or channels exceeding the maximum transmit power.

Some techniques and apparatuses described herein provide power control for spatial multiplexing of multiple uplink communications and/or channels. For example, some techniques and apparatuses described herein provide a UE that is capable of determining a manner in which to allocate power to multiple uplink communications and/or channels that are scheduled to overlap on at least one resource block, such as in cases when a scheduled transmit power for the multiple uplink communications and/or channels exceeds the maximum transmit power of the UE on overlapping resource blocks, when a scheduled transmit power for an uplink communication and/or channel exceeds an amount of transmit power available on overlapping resource blocks based at least in part on another amount of transmit power being used for a previously initiated uplink communication and/or channel, and/or the like.

Thus, some techniques and apparatuses described herein provide a UE that is capable of power control for multiple spatially multiplexed uplink communications and/or channels in situations when the UE is not capable of transmitting the multiple spatially multiplexed uplink communications and/or channels according to a respective scheduled transmit power for the multiple spatially multiplexed uplink communications and/or channels. This improves efficiency of management of power resources of the UE. In addition, this reduces or eliminates a need for the UE and a BS that scheduled the multiple uplink communications and/or channels to communicate to reschedule the multiple uplink communications and/or channels due to insufficient power headroom, thereby conserving computing resources of the UE and the BS, conserving network resources (e.g., time/frequency resources) of a connection between the UE and the BS, and/or the like. Further, this provides a predictable and efficient way for the UE to allocate power resources to multiple uplink communications and/or channels, thereby conserving processing resources associated with determining an allocation of power resources of the UE, reducing or eliminating delay associated with transmitting the multiple uplink communications and/or channels due to a scheduled transmit power exceeding a maximum transmit power for the UE, and/or the like.

Figure 4:
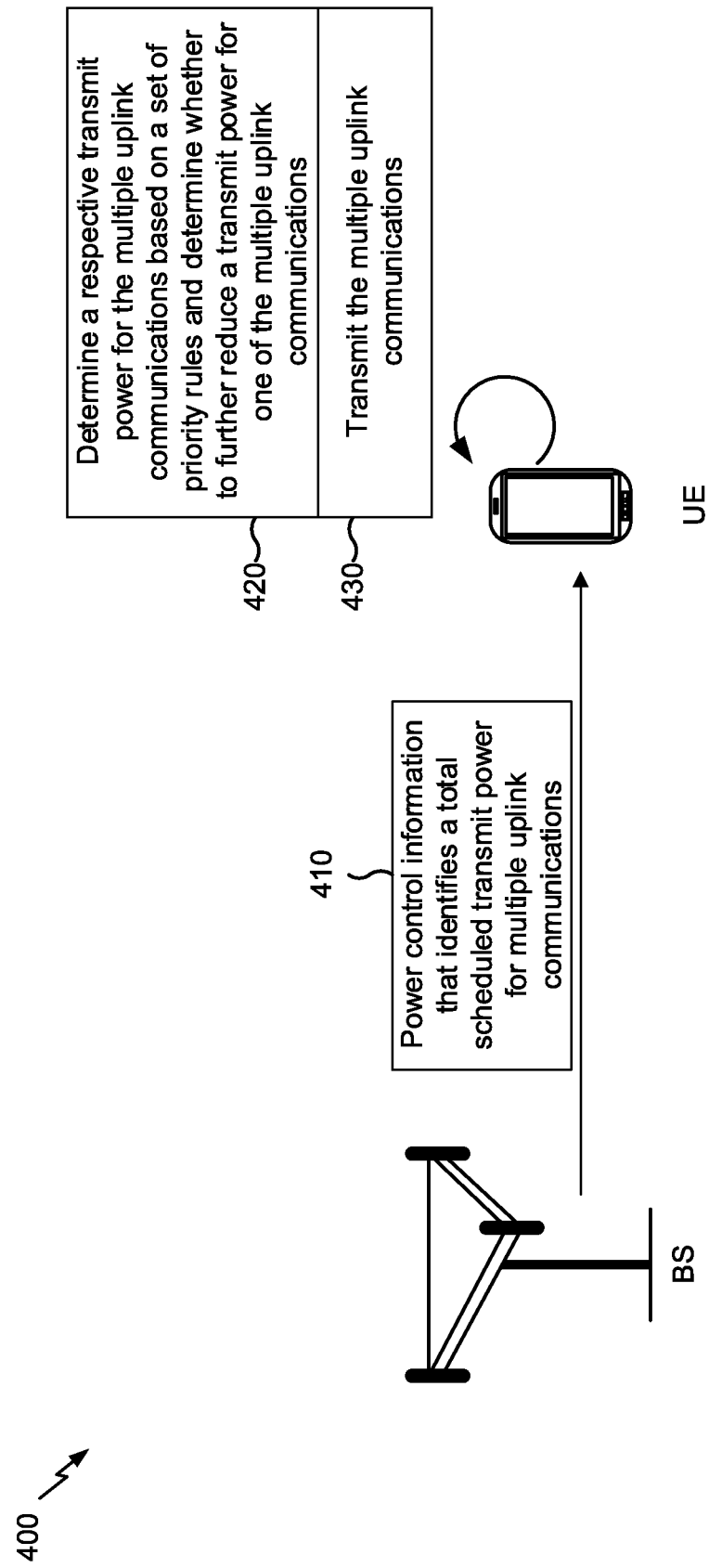
FIG. 4 is a diagram illustrating an example of power control for spatial multiplexing of uplink channels based at least in part on a set of priority rules, in accordance with various aspects of the present disclosure.

FIG. 4 is a diagram illustrating an example 400 of power control for spatial multiplexing of uplink channels based at least in part on a set of priority rules, in accordance with various aspects of the present disclosure. As shown in FIG. 4, example 400 includes a BS and a UE.

As shown by reference number 410, the BS may transmit, and the UE may receive, power control information that identifies a total scheduled transmit power for multiple uplink communications. For example, the BS may transmit, and the UE may receive, the information in association with downlink control information (DCI), a transmission power control (TPC) command, an uplink scheduling grant, and/or the like. In some implementations, the BS may transmit, and the UE may receive, scheduling information that identifies a schedule for the multiple uplink communications in association with the power control information (e.g., that identifies an OFDM symbol on which the multiple uplink communications are to be transmitted). In some implementations, the power control information may identify a total scheduled transmit power for multiple uplink channels, such as when the multiple uplink communications are associated with different uplink channels. In some implementations, the BS may transmit, and the UE may receive, scheduling information that identifies a schedule for multiple uplink channels, such as when the multiple uplink communications are associated with different uplink channels (e.g., that identifies OFDM symbols on which the multiple channels are to be transmitted). In some implementations, the multiple uplink channels and/or channels with which the multiple uplink communications are associated may be scheduled to be transmitted via different antennas associated with the UE and/or on a single component carrier.

In some implementations, the power control information may identify a respective scheduled transmit power for the multiple uplink communications (e.g., a first transmit power for a first uplink communication, a second transmit power for a second uplink communication, and so forth). In some implementations, an uplink communication may include a PRACH communication, a PUCCH communication, a PUSCH communication, an SRS, and/or the like. In some implementations, the multiple uplink communications may be associated with a same channel or different channels (e.g., may include multiple PRACH communications, may include a PUCCH communication and an SRS, etc.).

In some implementations, the UE may determine whether the multiple uplink communications are scheduled to overlap. For example, the UE may determine whether a first uplink communication and a second uplink communication are scheduled to start contemporaneously, are scheduled to have staggered start times such that a portion of the first uplink communication and a portion of the second uplink communication are occurring contemporaneously, and/or the like. Additionally, or alternatively, and as another example, the UE may determine whether the multiple uplink communications and/or channels with which the multiple uplink communications are associated are scheduled to start on a same OFDM symbol, overlap on at least one OFDM symbol, are to be transmitted contemporaneously, and/or the like. In some implementations, the UE may determine that the multiple uplink communications overlap on at least one OFDM symbol based at least in part on starting contemporaneously, based at least in part on being scheduled such that a respective portion of the multiple uplink communications is transmitted contemporaneously, and/or the like.

In some implementations, the UE may determine whether the total scheduled transmit power for the multiple uplink communications satisfies a threshold. For example, the UE may determine whether the total scheduled transmit power for the multiple uplink communications exceeds a maximum transmit power for the UE if the UE determines that the multiple uplink communications are scheduled to overlap on at least one OFDM symbol. For example, the UE may not perform this determination if the multiple uplink communications are not scheduled to overlap on at least one OFDM symbol. This conserves processing resources of the UE by reducing or eliminating a need for the UE to perform this determination if the multiple uplink communications are not scheduled to overlap on at least one OFDM symbol. In some implementations, if the UE determines that the total scheduled transmit power for the multiple uplink communications does not satisfy the maximum transmit power for the UE, then the UE may determine a respective transmit power for the multiple uplink communications, wherein the determined total respective transmit power for the multiple uplink communications satisfies the threshold. In some aspects, if the UE determines that the total scheduled transmit power for the multiple uplink communications satisfies the maximum transmit power for the UE, then the UE may transmit the multiple uplink communications using a respective scheduled transmit power for the multiple uplink communications. In some aspects, the above determinations may be combined into a single determination.

As shown by reference number 420, the UE may determine a respective transmit power for the multiple uplink communications based at least in part on a set of priority rules and may determine whether to further reduce a transmit power for one of the multiple uplink communications. For example, the UE may determine a first respective transmit power for a first uplink communication, a second respective transmit power for a second uplink communication, and/or the like. In some implementations, the UE may determine a respective transmit power for the multiple uplink communications after determining that the total scheduled transmit power for the multiple uplink communications does not satisfy the threshold and/or after determining that the multiple uplink communications are scheduled to overlap on at least one OFDM symbol. This reduces or eliminates a need for the UE to perform this determination when the total scheduled transmit power for the multiple uplink communications satisfies the threshold and/or when the multiple uplink communications are not scheduled to overlap on the at least one OFDM symbol.

In some implementations, the set of priority rules may identify a respective priority for different uplink communications. For example, the set of priority rules may identify or may be used to determine an amount of transmit power to allocate to different uplink communications based at least in part on the respective priorities for the different uplink communications. In some implementations, a respective priority may be associated with an allocation of transmit power (e.g., an uplink communication associated with a higher respective priority relative to another uplink communication would be prioritized over the other uplink communication with regard to allocation of transmit power). For example, the UE may determine a first respective transmit power for a first uplink communication based at least in part on the first uplink communication being associated with a first priority and may determine a second respective transmit power for a second uplink communication based at least in part on the second uplink communication being associated with a second priority (e.g., where the first priority is higher relative to the second priority). Continuing with the previous example, the UE may determine that the first respective transmit power of the first uplink communication is to be a scheduled transmit power for the first uplink communication, and that a second respective transmit power for the second uplink communication is to be a difference between the maximum transmit power of the UE and the first respective transmit power based at least in part on the respective priority of the first uplink communication being higher than the respective priority of the second uplink communication (e.g., the UE may allocate any available remaining transmit power to the second uplink communication after allocating the first respective transmit power, even if the scheduled transmit power for the second uplink communication is greater than the difference).

In some implementations, and as a specific example, the set of priority rules may identify a PRACH communication associated with a primary cell (Pcell) as having a highest priority relative to other uplink communications, may identify a PUCCH communication or a PUSCH communication associated with an ultra-reliable low latency communication (URLLC) service as having a second highest priority, may identify a PUCCH communication or a PUSCH communication associated with an enhanced mobile broadband (eMBB) service as having a third highest priority, may identify an SRS or a PRACH communication associated with a cell other than the Pcell as having a fourth highest priority, and/or the like. In some implementations, the set of priority rules may identify sub-priorities within different priorities. For example, for a PUCCH communication associated with a URLLC service or an eMBB service, the set of priority rules may identify a highest priority for a PUCCH communication associated with a scheduling request (SR), an acknowledgement (ACK), a negative acknowledgement (NACK), and/or the like, may identify a second highest priority for a PUCCH communication associated with channel state information (CSI), and/or the like. Additionally, or alternatively, and as another example relating to a PUSCH communication associated with a URLLC service or an eMBB service, a PUSCH communication associated with an ACK or a NACK may be associated with a highest priority relative to a PUSCH communication associated with CSI, which may be associated with a higher priority relative to a PUSCH communication not associated with an ACK, a NACK, or CSI. Additionally, or alternatively, and as another example relating to a PUCCH and a PUSCH communication associated with the same service type (e.g., a URLLC service or an eMBB service), a PUCCH communication associated with SR or an ACK or a NACK may have the same priority as a PUSCH communication associated with an ACK or a NACK, and a PUCCH communication associated with CSI may have the same priority as a PUSCH communication associated with CSI.

In some implementations, the UE may determine to allocate available transmit power to multiple uplink communications in order from highest priority to lowest priority. For example, the UE may determine to allocate transmit power to a first uplink communication with a highest relative priority first (e.g., may attempt to allocate a scheduled transmit power to the first uplink communication), may determine to allocate available transmit power to a second uplink communication associated with a second highest priority next (e.g., may attempt to allocate a scheduled transmit power to the second uplink communication or any remaining transmit power of a maximum transmit power of the UE to the second uplink communication if the scheduled transmit power for the second uplink communication is greater than the remaining transmit power), and so forth. In this way, the UE prioritizes allocation of transmit power to various uplink communications based at least in part on the priority of the channels with which the multiple uplink communications are associated.

In some implementations, if the multiple uplink communications are associated with a same priority (e.g., based at least in part on being associated with a same channel, based at least in part on being duplicate communications, and/or the like), then the UE may allocate the available transmit power to the multiple uplink communications proportionally accordingly to the scheduled transmit power of the multiple uplink communications. For example, if two uplink communications are scheduled to start on a same OFDM symbol and are associated with the same priority, and if the scheduled transmit power of the first uplink communication is $P_1$ and the scheduled transmit power of the second uplink communication is $P_2$ with $P_1+P_2$ being greater than the maximum transmit power $P_{max}$ for the UE, then the UE may determine to allocate $P_{max}*P_1/(P_1+P_2)$ power to the first uplink communication, and to allocate the remaining available transmit power to the second uplink communication.

In some implementations, the set of priority rules may be based at least in part on temporal aspects of the multiple uplink communications. For example, the set of priority rules may identify a higher relative priority for an uplink communication that starts earlier than another uplink communication. As a specific example, the UE may determine a higher priority for a first uplink communication relative to a second uplink communication based at least in part on the first uplink communication being scheduled with a starting OFDM symbol earlier than the starting OFDM symbol of the second uplink communication, even if the second uplink communication is associated with a channel that has a higher priority relative to another channel with which the first uplink communication is associated. In this case, the UE would allocate a scheduled transmit power to the first uplink communication upon initiating the first uplink communication and would allocate any remaining available transmit power (up to a scheduled transmit power for the second uplink communication) to the second uplink communication based at least in part on the second uplink communication being initiated after the first uplink communication. This reduces or eliminates a need for the UE to re-determine a transmit power for an uplink communication when the multiple uplink communications are initiated at different times. Additionally, or alternatively, this reduces or eliminates a need for the UE to consider potential future uplink communications when determining the power of the current uplink communication.

In some implementations, the UE may determine whether a particular combination of uplink communications is scheduled to be transmitted. For example, the UE may determine whether a particular combination of respective channels associated with the multiple uplink communications is scheduled to be transmitted by the UE. As a specific example, the UE may determine whether the multiple uplink communications include an SRS and at least one of a PUSCH communication or a PUCCH communication.

In some implementations, if the UE determines that the multiple uplink communications include a particular combination of uplink communications, then the UE may determine to modify a transmit power for an uplink communication of the multiple uplink communications (or to modify a scheduled transmit power if an uplink communication is to be transmitted using the scheduled transmit power). For example, the UE may determine to reduce a transmit power for one of the multiple uplink communications by a threshold amount (e.g., may determine that a power reduction is needed for one of the multiple uplink communications). As a specific example, the UE may determine to reduce a transmit power for an SRS by a first threshold amount based at least in part on a transmit power for a PUSCH communication and/or a PUCCH communication included in the multiple uplink communications (e.g., may determine to reduce the respective transmit power for the SRS such that the respective transmit power for the PUSCH communication and/or the PUCCH communication exceeds the respective transmit power for the SRS by a second threshold amount).

In some implementations, the UE may determine an amount by which to modify a transmit power based at least in part on a quantity of overlapping resource elements between the multiple uplink communications. For example, different percentages, quantities, and/or the like of overlapping resource elements (e.g., excluding a set of resource elements associated with a demodulation reference signal (DMRS), a phase tracking reference signal (PTRS), and/or the like) may indicate different amounts by which to modify a transmit power. Continuing with the previous example, a higher percentage, quantity, and/or the like of overlapping resource elements may indicate a larger reduction for one or more of the multiple uplink communications.

Additionally, or alternatively, the UE may determine an amount by which to modify a transmit power based at least in part on a modulation and coding scheme (MCS) index and/or a quantity of transmission layers associated with a PUSCH communication, when the multiple communications include a PUSCH communication. For example, different MCSs and/or different transmission layers may be associated with different susceptibilities to interference, and a respective transmission power may need to be adjusted to account for the different susceptibilities (e.g., an uplink communication associated with an MCS and/or a transmission layer that is associated with a higher relative susceptibility may need to be allocated more transmit power than another uplink communication associated with an MCS and/or a transmission layer that is associated with a lower relative susceptibility to compensate for the higher relative susceptibility). Additionally, or alternatively, the UE may determine an amount by which to modify a transmit power based at least in part on a PUCCH format or an uplink control information (UCI) type associated with a PUCCH communication, when the multiple communications include a PUCCH communication. For example, different PUCCH formats and/or different UCI types may be associated with different operations, may be associated with transmitting different amounts of information, and/or the like. Continuing with the previous example, some PUCCH formats and/or UCI types may have a higher priority relative to other PUCCH formats and/or UCI types based at least in part on these factors and, as a result, may be allocated more transmit power to ensure complete transmission, to compensate for interference, and/or the like.

In some implementations, the UE may use a set of rules to determine whether to modify a transmit power for an uplink communication, whether to maintain a transmit power for an uplink communication, and/or the like. For example, the set of rules may identify particular combinations of uplink communications that trigger a modification of a transmit power and a particular manner in which to modify a transmit power for the particular combination of uplink communications.

In some implementations, when determining to modify a transmit power for an uplink communication, the UE may determine to modify a transmit power only on a set of resource blocks where the multiple uplink communications overlap with each other, may determine to modify a transmit power on all resource blocks associated with an uplink communication, may determine to modify a transmit power on the set of resources block where the uplink communication and the other uplink communication overlap and on a portion of a set of non-overlapping resource blocks, and/or the like. Additionally, or alternatively, the UE may determine to modify a transmit power for an uplink transmission and/or an amount by which to modify the respective transmit power based at least in part on a radio resource control (RRC) configuration from a BS. For example, the RRC may include a set of instructions to cause the UE to reduce a transmit power, may include information that identifies an amount by which to modify the respective transmit power, may include information that indicates whether the UE should reduce the transmit power of an uplink communication only on the resource blocks that overlaps with another uplink communication or on all resource blocks associated with the uplink communication, and/or the like. Additionally, or alternatively, the UE may determine to modify a transmit power and/or an amount by which to modify the respective transmit power based at least in part on a quantity of overlapping resource blocks relative to a quantity of non-overlapping resource blocks. For example, a higher relative quantity of overlapping resource blocks relative a quantity of non-overlapping resource blocks may indicate a greater modification in a transmit power.

In this way, the UE may determine to modify a transmit power for an uplink communication and/or an amount by which to modify the respective uplink transmit power based at least in part on a semi-static configuration from a BS, a dynamic signal from the BS, a determination by the UE, and/or the like.

As shown by reference number 430, the UE may transmit the multiple uplink communications. For example, the UE may transmit the multiple uplink communications using the respective transmit power (e.g., may transmit a first uplink communication using a first respective transmit power and may transmit a second uplink communication using a second respective transmit power). In some implementations, the UE may transmit different uplink communications via different antennas associated with the UE and/or on a single component carrier. For example, the UE may transmit a first uplink transmission via a first antenna associated with the UE and may transmit a second uplink communication via a second antenna associated with the UE.

Although some implementations are described as being performed by a UE, the implementations may be performed by a BS. For example, the BS may determine a transmit power for multiple uplink communications in the manner described herein, and may transmit, to the UE, information that identifies the respective transmit powers for the multiple uplink communications so that the UE can transmit the multiple uplink communications at the respective transmit powers.

As indicated above, FIG. 4 is provided as an example. Other examples may differ from what was described with respect to FIG. 4.

Figure 5:
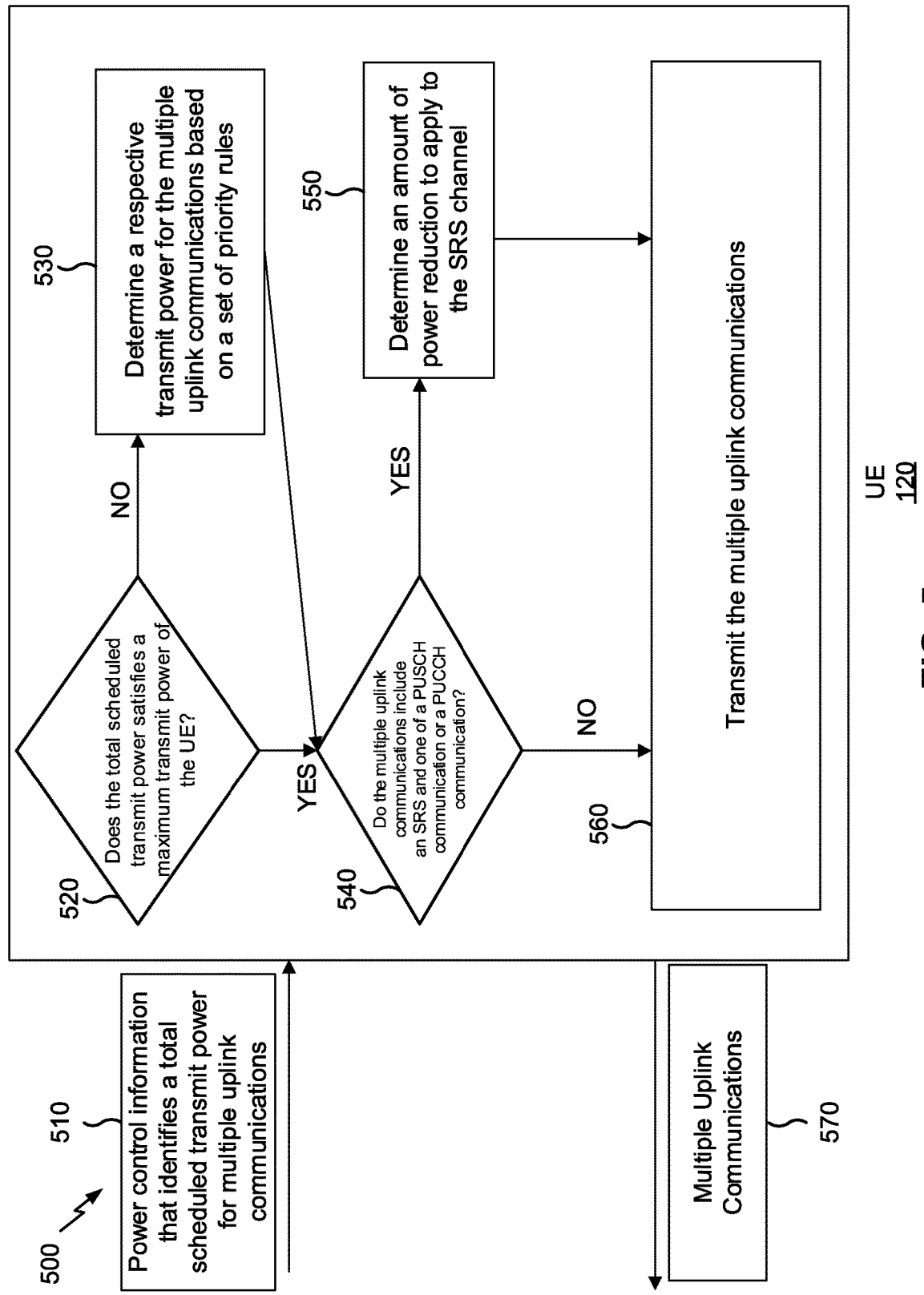
FIG. 5 is a diagram illustrating an example of power control for spatial multiplexing of uplink channels based at least in part on a set of priority rules, in accordance with various aspects of the present disclosure.

FIG. 5 is a diagram illustrating an example 500 of power control for spatial multiplexing of uplink channels based at least in part on a set of priority rules, in accordance with various aspects of the present disclosure. As shown in FIG. 5, example 500 may include a UE.

As shown by reference number 510, the UE may receive power control information that identifies a total scheduled transmit power for multiple uplink communications. For example, the UE may receive the power control information from a BS, in association with a TPC command, and/or the like, in a manner similar to that described elsewhere herein. As shown by reference number 520, the UE may determine whether the total scheduled transmit power satisfies a maximum transmit power of the UE. For example, the UE may determine whether the total scheduled transmit power for the multiple uplink transmissions exceeds the maximum transmit power of the UE in a manner similar to that described elsewhere herein.

As shown by reference number 530, if the UE determines that the total scheduled transmit power does not satisfy the maximum transmit power of the UE (reference number 520—NO), then the UE may determine a respective transmit power for the multiple uplink communications based at least in part on a set of priority rules (e.g., when the total scheduled transmit power is greater than a maximum transmit power of the UE). For example, the UE may determine a transmit power for an uplink communication based at least in part on a set of priority rules that identifies a respective priority of the multiple uplink communications for allocation of available transmit power, in a manner similar to that described elsewhere herein. As shown by reference number 540, the UE may determine whether the multiple uplink communications include an SRS and one of a PUSCH communication or a PUCCH communication. For example, the UE may perform this determination after determining that the total scheduled transmit power satisfies the maximum transmit power (reference number 520—YES), after determining a respective transmit power for the multiple uplink communications (reference number 530), and/or the like, in a manner similar to that described elsewhere herein.

As shown by reference number 550, the UE may determine an amount of power reduction to apply to the SRS channel after determining that the multiple uplink communications include an SRS and one of a PUSCH communication or a PUCCH communication (reference number 540—YES). For example, the UE may make this determination in a manner similar to that described elsewhere herein.

As shown by reference numbers 560 and 570, the UE may transmit the multiple uplink communications. For example, the UE may transmit the multiple uplink communications at a respective scheduled transmit power when the total scheduled transmit power satisfies the maximum transmit power of the UE, at respective transmit power that the UE determined when the total scheduled transmit power of the multiple uplink communications does not satisfies the maximum transmit power of the UE, at a reduced respective scheduled transmit power or at a reduced respective transmit power when the multiple uplink communications include an SRS and at least one of a PUSCH communication and a PUCCH communication, and/or the like.

As indicated above, FIG. 5 is provided as an example. Other examples may differ from what is described with respect to FIG. 5. For example, a BS may perform some of the implementations described with regard to FIG. 5, and may transmit, to the UE, information that identifies a transmit power at which the UE is to transmit multiple uplink communications.

Figure 6:
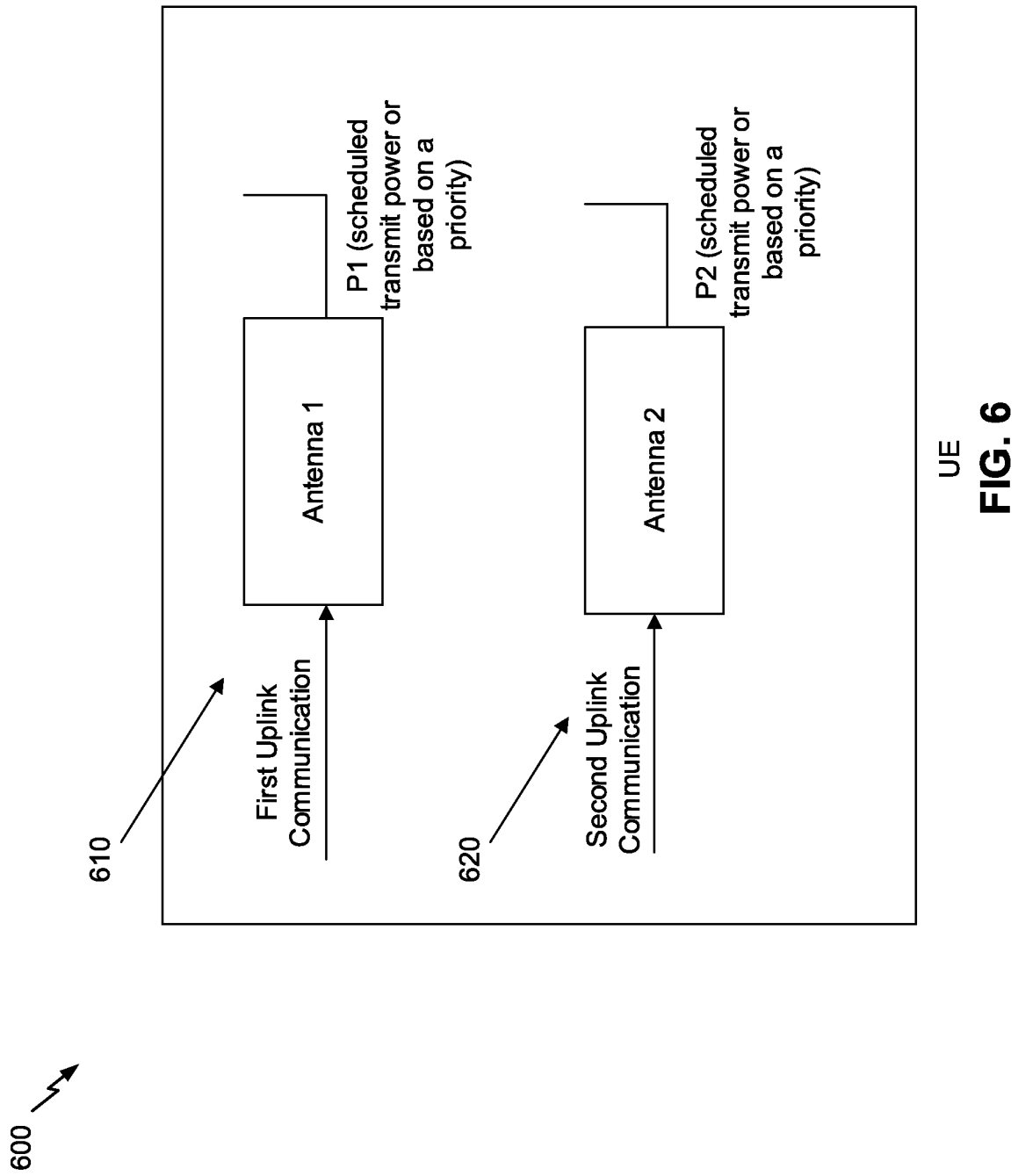
FIG. 6 is a diagram illustrating an example of power control for spatial multiplexing of uplink channels based at least in part on a set of priority rules, in accordance with various aspects of the present disclosure.

FIG. 6 is a diagram illustrating an example 600 of power control for spatial multiplexing of uplink channels based at least in part on a set of priority rules, in accordance with various aspects of the present disclosure. As shown in FIG. 6, example 600 includes a UE that is configured with multiple antennas (e.g., antenna 1 and antenna 2).

As shown by reference number 610, the UE may transmit a first uplink communication (e.g., associated with a first channel) via antenna 1. In some implementations, the UE may transmit the first uplink communication at a first transmit power (e.g., P1). As shown by reference number 620, the UE may transmit a second uplink communication (e.g., associated with a second channel that is different than the first channel) via antenna 2. In some implementations, the UE may transmit the second uplink communication at a second transmit power (e.g., P2).

In some implementations, the combined first transmit power and second transmit power may be equal to or less than a maximum transmit power of the UE. For example, P1 and P2 may be a scheduled transmit power or based at least in part on a relative respective priority of the first uplink communication and the second uplink communication. In some implementations, the UE may determine P1 and P2 in a manner that is the same as or similar to that described with regard to FIGS. 4 and 5.

As indicated above, FIG. 6 is provided as an example. Other examples may differ from what is described with respect to FIG. 6.

Figure 7:
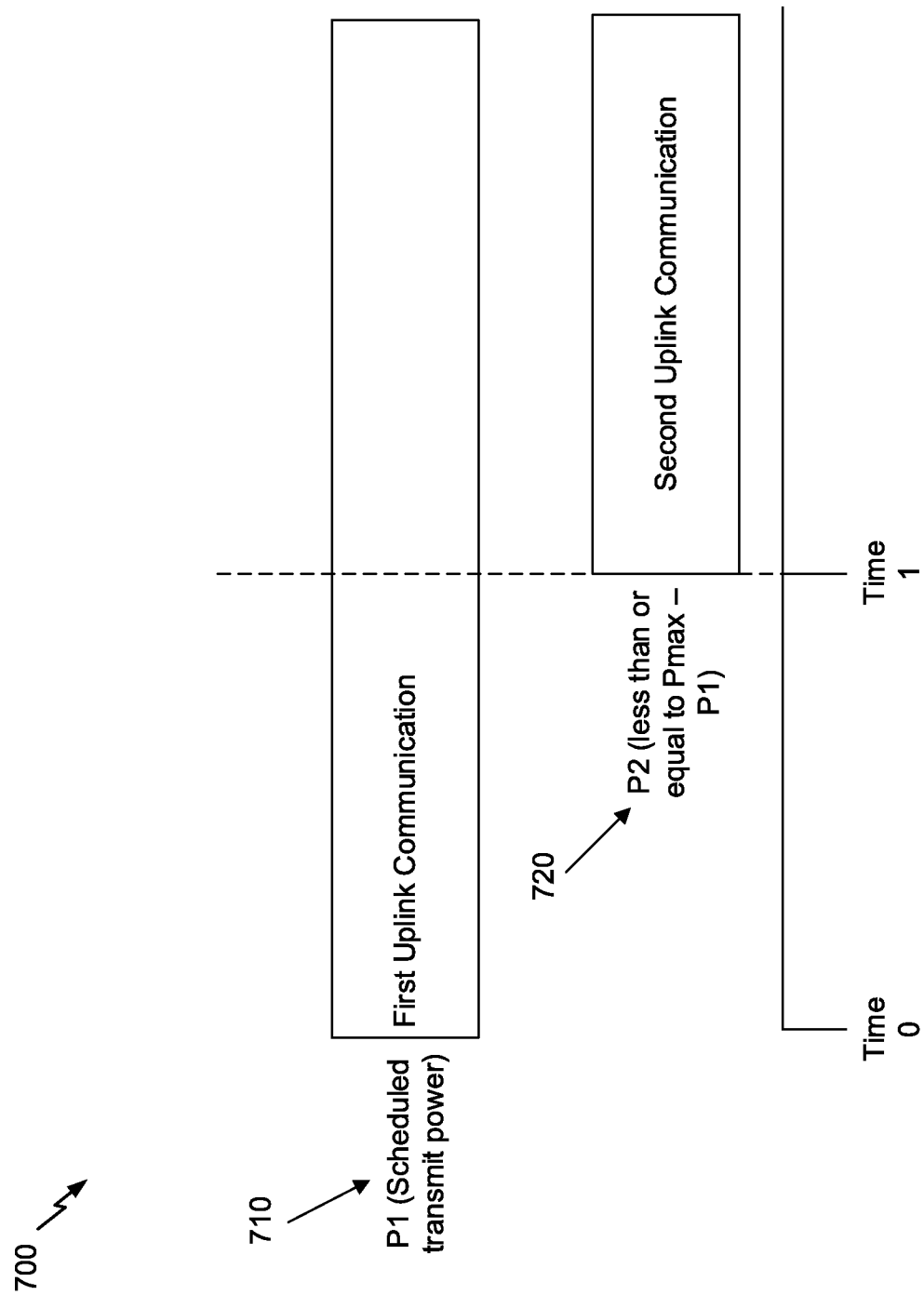
FIG. 7 is a diagram illustrating an example of power control for spatial multiplexing of uplink channels based at least in part on a set of priority rules, in accordance with various aspects of the present disclosure.

FIG. 7 is a diagram illustrating an example 700 of power control for spatial multiplexing of uplink channels based at least in part on a set of priority rules, in accordance with various aspects of the present disclosure. FIG. 7 shows an example of prioritizing different uplink communication based at least in part on temporal aspects of the different uplink communications.

As shown by reference number 710, a UE may start transmission of a first uplink communication at time 0. In some implementations, the first uplink communication may not overlap with any other uplink communications at the time the first uplink communication is started. Based at least in part on this, the UE may transmit the first uplink communication at a scheduled transmit power for the first uplink communication (e.g., P1). As shown by reference number 720, the UE may initiate a transmission of a second uplink communication at time 1, while the UE is still transmitting the first uplink communication (e.g., the first uplink communication and the second uplink communication may overlap on at least one OFDM symbol). Based at least in part on this, the UE may transmit the second uplink transmission using a transmit power that is less than or equal to the maximum transmit power of the UE (e.g., Pmax) minus P1 (e.g., using a transmit power that is no more than a difference between Pmax and P1). For example, if the scheduled transmit power for the second uplink communication is greater than this difference, then the UE may transmit the second uplink communication at a transmit power equal to the difference. Conversely, if the scheduled transmit power for the second uplink communication is less than this difference, then the UE may transmit the second uplink communication at the scheduled transmit power for the second uplink communication. In some implementations, the UE may prioritize the first uplink communication and the second uplink communication in this manner regardless of whether a channel with which the second uplink communication is associated has a higher priority relative to another channel with which the first uplink communication is associated.

In some aspects, the UE may perform power control at a symbol-by-symbol granularity. For example, the UE may perform power control per OFDM symbol. In this case, the UE may use scheduled power levels (e.g., P1 and P2) on non-overlapped portions of the communications, and may use a determined power, based at least in part on the prioritization rules described above, in overlapped portions of the communications. In the case of example 700, the UE may use P1 between time 0 and time 1, and may determine the transmit powers after time 1 in accordance with priority levels of the first uplink communication and the second uplink communication. If the first uplink communication is associated with a higher priority, then the UE may transmit the first uplink communication at P1 and the second uplink communication at Pmax−P1. If the second uplink communication is associated with a higher priority, then the UE may transmit the first uplink communication at Pmax−P2 and the second uplink communication at P2.

In some aspects, the UE may drop a low-priority channel in addition to or as an alternative to the techniques described in connection with FIGS. 4-7, above. For a UE with two transmit antennas, the UE may be able to transmit at a maximum power Pmax/2 on each antenna, thereby achieving a maximum power of Pmax from the two antennas. For example, the UE may drop a low-priority channel when a transmit power of a high-priority channel is above Pmax/2. In this case, the UE may transmit the high-priority channel using both antennas of the UE with a total power equal to the scheduled power of the high-priority channel. If the scheduled power for the low-priority channel exceeds Pmax/2, and the scheduled power of the high-priority channel is below Pmax/2, then the UE may cap the power of the low-priority channel at Pmax/2.

As an example, suppose that a UE has a total power P_max and four antennas, where channel 1 is transmitted on 3 antennas and channel 2 is transmitted on 1 antenna. Then, the maximum power for channel 1 may be ¾*P_max, and the maximum power for channel 2 may be P_max/4.

(e.g., with N TX antennas, each antenna has maximum power P_max/N)

As indicated above, FIG. 7 is provided as an example. Other examples may differ from what is described with respect to FIG. 7.

Figure 8:
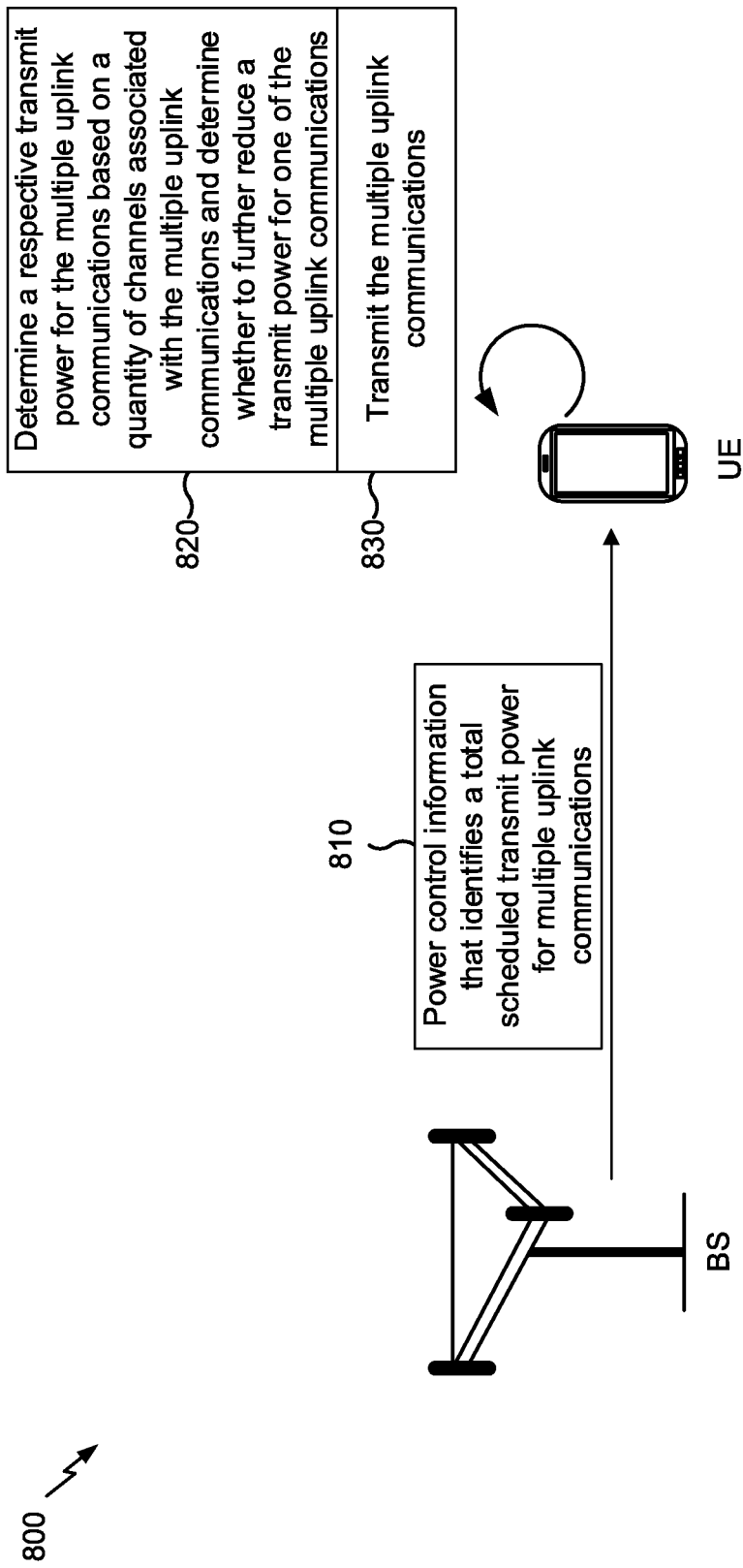
FIG. 8 is a diagram illustrating an example of power control for spatial multiplexing of uplink channels based at least in part on a quantity of channels configured and/or a quantity of channels scheduled, in accordance with various aspects of the present disclosure.

FIG. 8 is a diagram illustrating an example 800 of power control for spatial multiplexing of uplink channels based at least in part on a quantity of channels configured and/or a quantity of channels scheduled, in accordance with various aspects of the present disclosure. As shown in FIG. 8, example 800 includes a BS and a UE.

As shown by reference number 810, the BS may transmit, and the UE may receive, power control information that identifies a total scheduled transmit power for multiple uplink communications. For example, the UE may receive the power control information in a manner similar to that described elsewhere herein.

As shown by reference number 820, the UE may determine a respective transmit power for the multiple uplink communications based at least in part on a quantity of channels associated with the multiple uplink communications and may determine whether to further reduce a transmit power for one of the multiple uplink communications. For example, the UE may determine a transmit power for an uplink communication based at least in part on a quantity of channels associated with the multiple uplink communications after receiving the power control information.

In some implementations, the UE may determine the respective transmit power for the multiple uplink communications based at least in part on a quantity of channels that the UE is configured to use. For example, the UE may determine the respective transmit power for the multiple uplink communications by dividing a maximum transmit power of the UE by the quantity of channels that the UE is configured to use. As a specific example, if a UE is configured to use up to four channels, then the UE may determine that each channel can be allocated up to one-fourth of the maximum transmit power of the UE, regardless of whether the UE is scheduled to use all four of the channels simultaneously, regardless of whether a total scheduled transmit power for the multiple uplink communications satisfies a maximum transmit power of the UE, regardless of whether a transmit power for the multiple uplink communications is equal to one-fourth of the maximum transmit power of the UE, and/or the like. As another specific example, if the UE is configured to use at most three channels, then the UE may determine that each channel may be allocated up to one-third of the maximum transmit power of the UE.

In some implementations, the UE may use this determination to determine a maximum transmit power for an uplink communication. For example, and referring to the previous example, if an uplink communication is scheduled to use less than one-fourth of a maximum transmit power of the UE, the UE may determine to use the scheduled transmit power for the uplink communication. This provides an efficient way for the UE to determine a transmit power for the multiple uplink communications, thereby conserving processing resources of the UE associated with determining a transmit power and/or reducing an amount of time needed to determine a transmit power.

In some implementations, the UE may determine the respective transmit power for the multiple uplink communications based at least in part on a quantity of channels that the UE is scheduled to use. For example, the UE may determine the respective transmit power for the multiple uplink communications by dividing a maximum transmit power of the UE by the quantity of channels the that the UE is scheduled to use. As a specific example, if the UE is scheduled to transmit two uplink channels contemporaneously (e.g., when the UE is capable of transmitting more than two channels contemporaneously), then the UE may determine that each of the two channels may be allocated up to half of the maximum transmit power of the UE (e.g., may use less than half when a scheduled transmit power for a channel is less than half of the maximum transmit power, may use half of the maximum transmit power when the scheduled transmit power is more than half of the maximum transmit power, and/or the like), regardless of whether the UE is configured to use more than two channels to transmit the multiple uplink communications, regardless of whether a respective scheduled transmit power for the multiple uplink communications is equal to half of the maximum transmit power of the UE, regardless of whether a total scheduled transmit power for the multiple uplink communications satisfies a maximum transmit power of the UE, and/or the like. As anther specific example, if the UE is scheduled to use three channels, then the UE may determine that each channel is to be allocated up to one-third of the maximum transmit power of the UE.

In some implementations, the UE may use this determination to determine a maximum transmit power for an uplink communication. For example, and referring to the previous example, if an uplink communication is scheduled to use less than one-half of a maximum transmit power of the UE, the UE may determine to use the scheduled transmit power for the uplink communication.

In some implementations, the UE may determine whether the multiple uplink communications are scheduled to overlap on at least one OFDM symbol after receiving the power control information prior to determining the respective transmit power, in a manner similar to that described elsewhere herein. For example, the UE may determine whether a first uplink communication and a second uplink communication are scheduled to start contemporaneously, are scheduled to have staggered start times such that a portion of the first uplink communication and a portion of the second uplink communication are occurring contemporaneously, and/or the like prior to determining the respective transmit power for the multiple uplink communications. In some implementations, the UE may not determine the respective transmit power if the multiple uplink communications do not overlap on at least one resource block, thereby conserving processing resources of the UE.

In some implementations, if a first uplink communication is scheduled to start before a second uplink communication, then the UE may determine that a scheduled transmit power for the first uplink communication is to be used to transmit the first uplink communication and that the second uplink communication is to be transmitted using any remaining transmit power, in a manner similar to that described elsewhere herein. This reduces or eliminates a need for the UE to account for future uplink transmissions when determining an amount of transmit power to use for an uplink transmission.

In some implementations, the UE may determine whether the total scheduled transmit power for the multiple uplink communications satisfies a threshold prior to determining the respective transmit power, in a manner similar to that described elsewhere herein. For example, the UE may determine whether the total scheduled transmit power for the multiple uplink communications exceeds a maximum transmit power for the UE during a time when the multiple uplink communications are overlapping on the same OFDM symbol prior to determining the respective transmit power for the multiple uplink communications. In some implementations, the UE may not determine the respective transmit power if the total scheduled power for the multiple uplink transmissions do not overlap on at least one resource block, thereby conserving processing resources of the UE.

In some implementations, the UE may determine to modify a transmit power and/or may determine an amount by which to modify a transmit power after determining the respective transmit power, in a manner similar to that described elsewhere herein. For example, the UE may determine to modify a transmit power based at least in part on the multiple uplink communications including an SRS and at least one of a PUSCH communication or a PUCCH communication. Additionally, or alternatively, and as another example, the UE may determine an amount by which to modify a transmit power based at least in part on a quantity of overlapping resource elements between the multiple uplink communications, based at least in part on an MCS index and/or a quantity of transmission layers associated with a PUSCH communication (e.g., when the multiple uplink communications include a PUSCH communication), based at least in part on a PUCCH format and/or a UCI type associated with a PUCCH communication (e.g., when the multiple uplink communications include a PUCCH communication), and/or the like.

As shown by reference number 830, the UE may transmit the multiple uplink communications. For example, the UE may transmit the multiple uplink communications on a same OFDM symbol using a transmit power that the UE determined for an uplink communication. Additionally, or alternatively, and as another example, the UE may transmit the multiple uplink communications at a scheduled transmit power, such as when a total scheduled transmit power for the multiple uplink communications does not satisfy a maximum transmit power of the UE. Additionally, or alternatively, the UE may transmit the multiple uplink communications via different antennas and on a single component carrier.

In some aspects, the UE may signal a capability to the BS. For example, the UE may signal a power amplifier capability that indicates respective maximum transmit powers of each power amplifier of the UE. If each power amplifier is capable of transmitting at Pmax, then the UE may use any of the techniques described herein for power management (e.g., priority-based techniques, hard power split-based techniques, and channel dropping techniques). If each power amplifier is only capable of transmitting at a power Pmax/N, where N is the number of transmit antennas or antenna ports associated with the UE, then the UE may be capable of supporting only the hard power split-based technique or the channel dropping technique. In this case, the UE may transmit at Pmax only when all power amplifiers are transmitting at Pmax/N. As another example, the UE may transmit information identifying which of the techniques described herein (e.g., priority-based techniques, hard power split-based techniques, and channel dropping techniques) are supported by the UE. In these cases, the BS may configure the UE to use one or more of the techniques described herein based at least in part on the capability of the UE (e.g., using RRC signaling and/or the like).

Although some implementations were described as being performed by a UE, the implementations may be performed by a BS. For example, the BS may determine a respective transmit power for multiple uplink communications in the manner described herein, and may transmit, to the UE, information that identifies the respective transmit power for the multiple uplink communications so that the UE can transmit the multiple uplink communications at the respective transmit power.

As indicated above, FIG. 8 is provided as an example. Other examples may differ from what is described with respect to FIG. 8.

Figure 9:
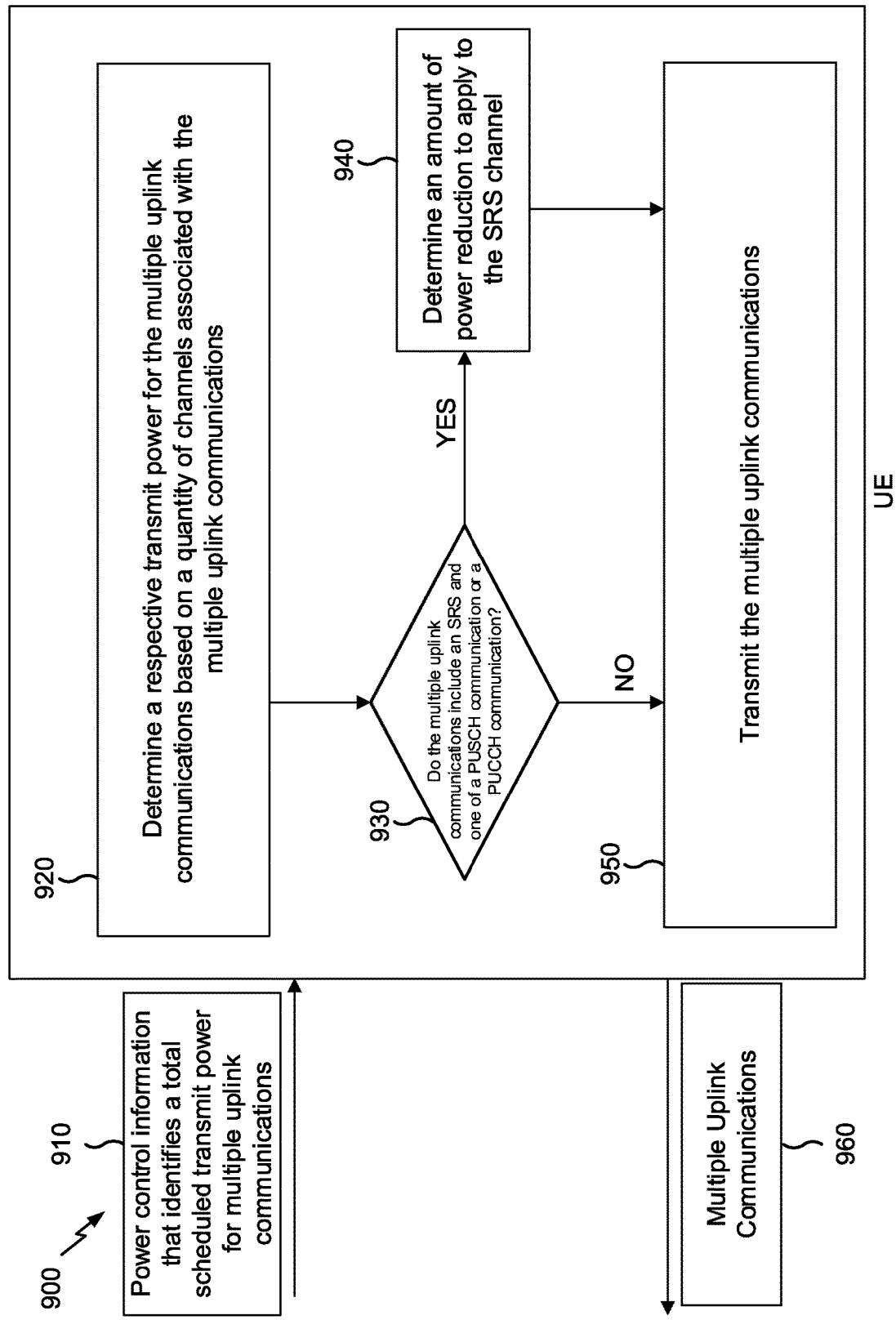
FIG. 9 is a diagram illustrating an example of power control for spatial multiplexing of uplink channels based at least in part on a quantity of channels configured and/or a quantity of channels scheduled, in accordance with various aspects of the present disclosure.

FIG. 9 is a diagram illustrating an example 900 of power control for spatial multiplexing of uplink channels based at least in part on a quantity of channels configured and/or a quantity of channels scheduled, in accordance with various aspects of the present disclosure. As shown in FIG. 9, example 900 may include a UE.

As shown by reference number 910, the UE may receive power control information that identifies a total scheduled transmit power for multiple uplink communications. For example, the UE may receive the power control information from a BS, in association with a TPC command, and/or the like, in a manner similar to that described elsewhere herein. As shown by reference number 920, the UE may determine a respective transmit power for the multiple uplink communications based at least in part on a quantity of channels associated with the multiple uplink communications. For example, the UE may determine the respective transmit power based at least in part on a quantity of channels that the UE is configured to use and/or based at least in part on a quantity of channels that the UE is scheduled to use, in a manner similar to that described elsewhere herein. As shown by reference number 930, the UE may determine whether the multiple uplink communications include an SRS and one of a PUSCH communication or a PUCCH communication. For example, the UE may perform this determination after determining a respective transmit power for the multiple uplink communications (reference number 920), in a manner similar to that described elsewhere herein.

As shown by reference number 940, the UE may determine an amount of power reduction to apply to the SRS channel after determining that the multiple uplink communications include an SRS and one of a PUSCH communication or a PUCCH communication (reference number 930—YES). For example, the UE may make this determination in a manner similar to that described elsewhere herein.

As shown by reference numbers 950 and 960, the UE may transmit the multiple uplink communications. For example, the UE may transmit the multiple uplink communications at a respective scheduled transmit power when the total scheduled transmit power does not satisfy the maximum transmit power of the UE, at respective transmit power based at least in part on a quantity of channels the UE is configured to use and/or a quantity of channels that the UE scheduled to use, at a reduced respective scheduled transmit power or a reduced respective transmit power when the multiple uplink communications include an SRS and at least one of a PUSCH communication and a PUCCH communication (e.g., based at least in part on the determination performed with respect to reference number 940), when the UE determines that the multiple uplink communications do not include an SRS and one of a PUSCH communication or a PUCCH communication (reference number 930—NO), and/or the like.

As indicated above, FIG. 9 is provided as an example. Other examples may differ from what is described with respect to FIG. 9. For example, a BS may perform some of the implementations described with regard to FIG. 9, and may transmit, to the UE, information that identifies a respective transmit power at which the UE is to transmit multiple uplink communications.

Figure 10:
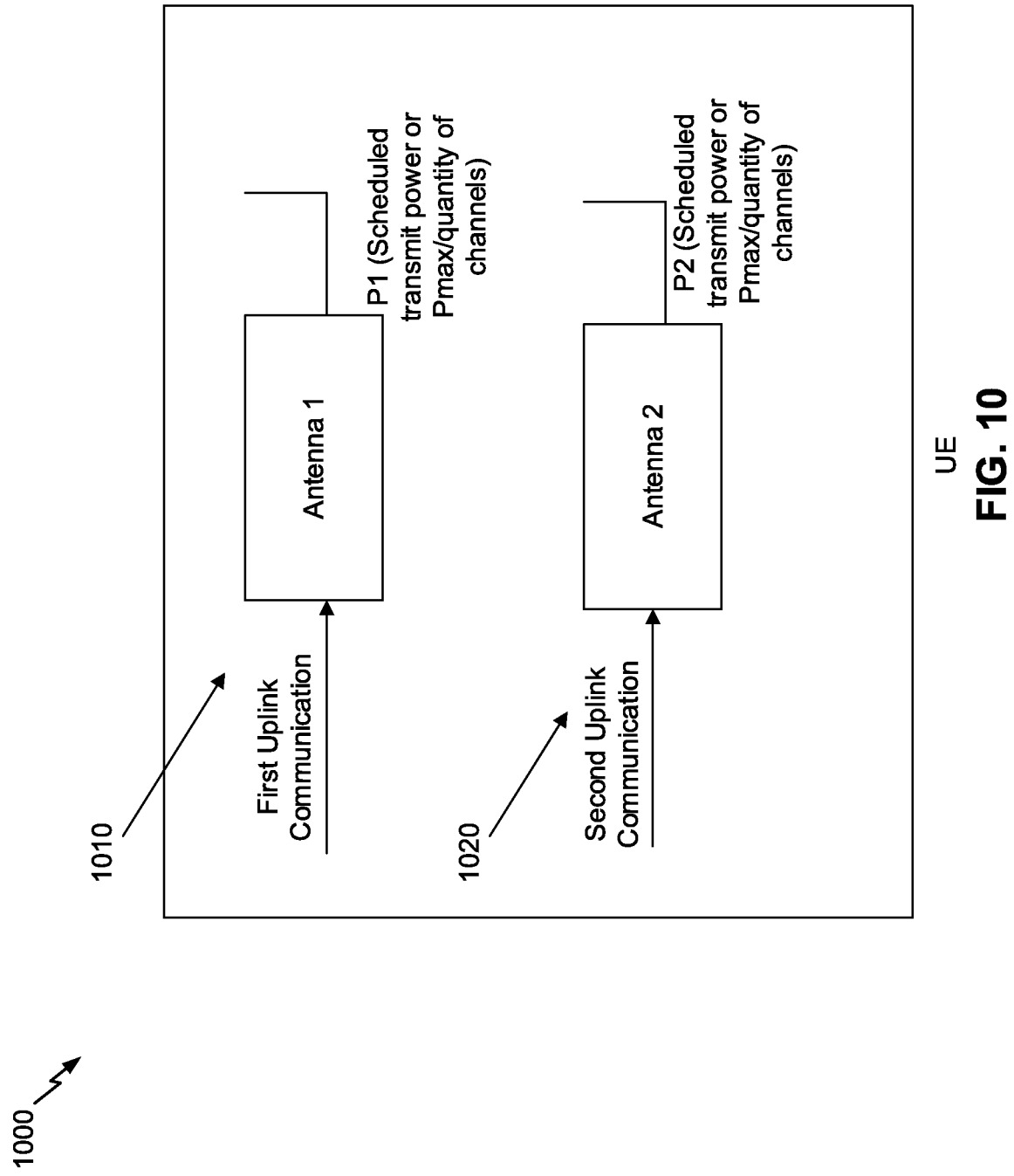
FIG. 10 is a diagram illustrating an example of power control for spatial multiplexing of uplink channels based at least in part on a quantity of channels configured and/or a quantity of channels scheduled, in accordance with various aspects of the present disclosure.

FIG. 10 is a diagram illustrating an example 1000 of power control for spatial multiplexing of uplink channels based at least in part on a quantity of channels configured and/or a quantity of channels scheduled, in accordance with various aspects of the present disclosure. As shown in FIG. 10, example 1000 includes a UE that is configured with multiple antennas (e.g., antenna 1 and antenna 2).

As shown by reference number 1010, the UE may transmit a first uplink communication (e.g., associated with a first channel) via antenna 1. In some implementations, the UE may transmit the first uplink communication at a first transmit power (e.g., P1). In some implementations, P1 may be equal to a scheduled transmit power for the first uplink communication or a maximum transmit power of the UE (e.g., Pmax) divided by a quantity of channels that the UE is configured to use and/or a quantity of channels the UE is scheduled to use. As shown by reference number 1020, the UE may transmit a second uplink communication (e.g., associated with a second channel that is different than the first channel) via antenna 2. In some implementations, the UE may transmit the second uplink communication at a second transmit power (e.g., P2). In some implementations, P2 may be equal to a scheduled transmit power for the second uplink communication or a maximum transmit power of the UE (e.g., Pmax) divided by a quantity of channels the that the UE is configured to use and/or a quantity of channels that the UE is scheduled to use. In some implementations, the combined first transmit power and second transmit power may be equal to or less than a maximum transmit power of the UE. For example, if a scheduled transmit power for an uplink transmission is less than a maximum transmit power of the UE divided by a quantity of channels, the UE may transmit the uplink transmission at the scheduled transmit power. In this way, the UE may determine maximum values for uplink transmissions based at least in part on a quantity of channels associated with the UE.

As indicated above, FIG. 10 is provided as an example. Other examples may differ from what is described with respect to FIG. 10.

Figure 11:
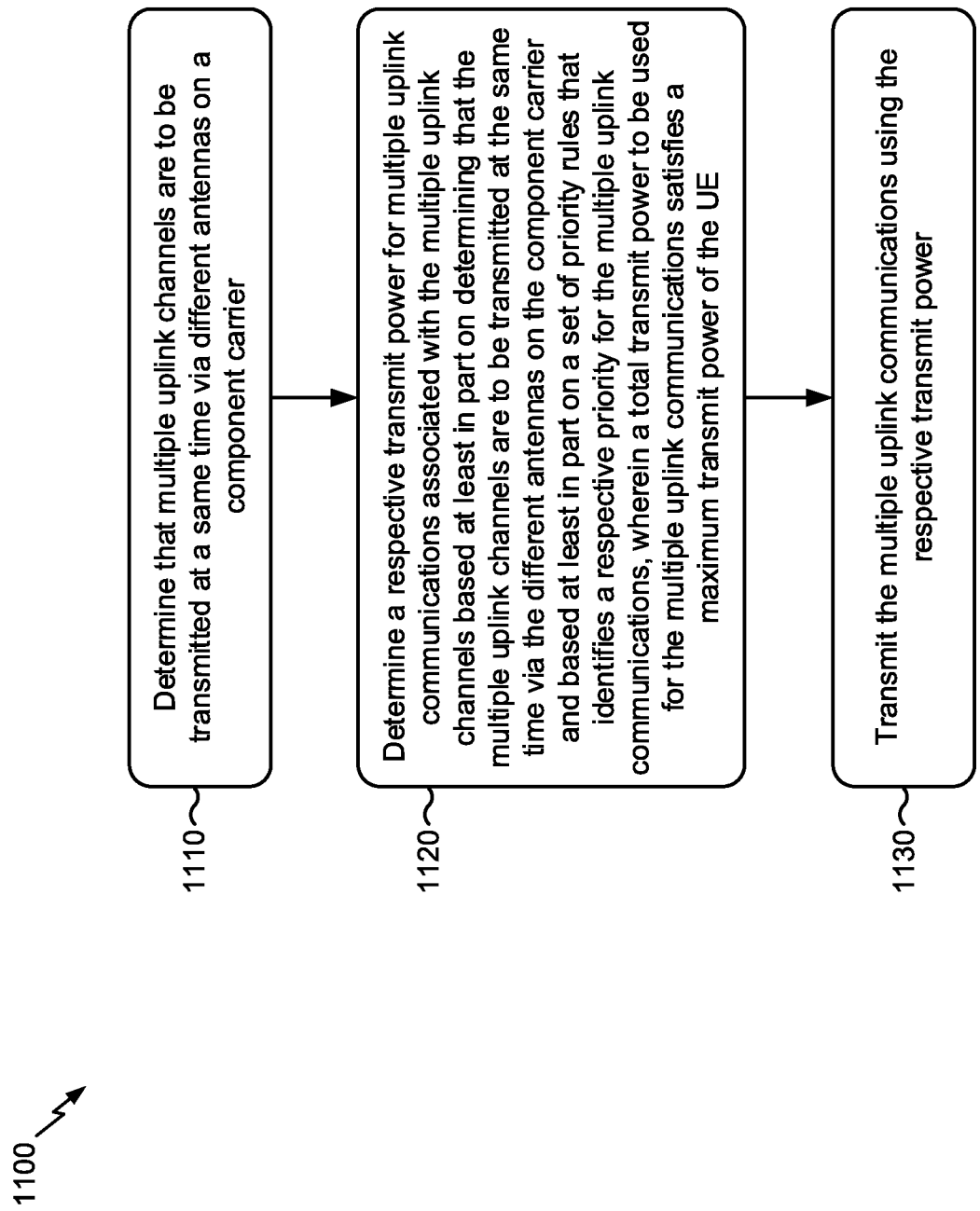
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120) performs power control for spatial multiplexing of uplink channels based at least in part on a set of priority rules.

As shown in FIG. 11, in some aspects, process 1100 may include determining that multiple uplink channels are to be transmitted contemporaneously via different antennas on a component carrier (block 1110). For example, the UE (e.g., UE 120 using controller/processor 280 and/or the like) may determine that multiple uplink channels are to be transmitted contemporaneously via different antennas on a component carrier, as described elsewhere herein.

As further shown in FIG. 11, in some aspects, process 1100 may include determining a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, wherein a total transmit power to be used for the multiple uplink communications satisfies a maximum transmit power of the UE (block 1120). For example, the UE (e.g., UE 120 using controller/processor 280 and/or the like) may determine a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, as described elsewhere herein. In some aspects, a total transmit power to be used for the multiple uplink communications may satisfy a maximum transmit power of the UE.

As further shown in FIG. 11, in some aspects, process 1100 may include determining whether a power reduction is needed for the respective transmit power based at least in part on determining the respective transmit power for the multiple uplink communications (block 1130). For example, the UE (e.g., UE 120 using controller/processor 280 and/or the like) may determine whether a power reduction is needed for the respective transmit power based at least in part on determining the respective transmit power for the multiple uplink communications, as described elsewhere herein.

As further shown in FIG. 11, in some aspects, process 1100 may include transmitting the multiple uplink communications using the respective transmit power based at least in part on determining whether the power reduction is needed (block 1140). For example, the UE (e.g., UE 120 using controller/processor 280, transmit processor 264, TX MIMO processor 266, MOD 254, antenna 252, and/or the like) may transmit the multiple uplink communications using the respective transmit power based at least in part on determining whether the power reduction is needed, as described elsewhere herein.

Process 1100 may include additional aspects, such as any single aspect or any combination of aspects described below and/or in connection with one or more other processes described elsewhere herein.

In some aspects, the UE may determine whether the power reduction is needed based at least in part on: a first uplink communication of the multiple uplink communications being a sounding reference signal (SRS), and a second uplink communication of the multiple uplink communications being a physical uplink shared channel (PUSCH) communication or a physical uplink control channel (PUCCH) communication. In some aspects, the UE may determine to reduce a first respective transmit power for the first uplink communication by a first threshold amount based at least in part on the first uplink communication including the SRS and the second uplink communication including the at least one of the PUSCH communication or the PUCCH communication, wherein the first threshold amount is based at least in part on a second respective transmit power for the second uplink communication.

In some aspects, the first threshold amount causes the second respective transmit power for the second uplink communication to exceed the first respective transmit power for the first uplink communication by at least a second threshold amount. In some aspects, the second threshold amount is based at least in part on: a quantity of overlapping resource elements between the first uplink communication and the second uplink communication relative to a total quantity of resources elements associated with the second uplink communication excluding a set of resource elements associated with a demodulation reference signal (DMRS) or a phase tracking reference signal (PTRS), a modulation and coding scheme (MCS) index or a quantity of transmission layers associated with the PUSCH communication when the second uplink communication includes the PUSCH communication, or a PUCCH format and an uplink control information (UCI) type associated with the PUCCH communication when the second uplink communication includes the PUCCH communication. In some aspects, the UE may determine to reduce the first respective transmit power by the first threshold amount on a set of overlapping resource blocks associated with the first uplink communication and the second uplink communication and to not reduce the first respective transmit power for a set of non-overlapping resource blocks associated with the first uplink communication, or may determining to reduce the first respective transmit power by the first threshold amount on all resource blocks associated with the first uplink communication.

In some aspects, the UE may determine to reduce the first respective transmit power on all resource elements of a first channel associated with the first uplink communication or to reduce the first respective transmit power on the set of overlapping resource blocks and not on the set of non-overlapping resource blocks based at least in part on: a radio resource control (RRC) configuration received from a base station (BS), or a quantity of overlapping resource elements between the first uplink communication and the second uplink communication relative to a total quantity of resources elements associated with the first uplink communication. In some aspects, the UE may determine to reduce the first respective transmit power by the first threshold amount based at least in part on at least one of: a semi-static configuration from a base station (BS), a dynamic signal from the BS, or a determination by the UE.

In some aspects, the UE may determine that a total scheduled or configured transmit power to be used for the multiple uplink communications does not satisfy the maximum transmit power of the UE. In some aspects, the UE may determine a scheduled transmit power as a first respective transmit power for a first uplink communication, of the multiple uplink communications, and a difference between the maximum transmit power of the UE and the first respective transmit power as a second transmit power for a second uplink communication, of the multiple uplink communications, based at least in part on determining that the first uplink communication has a higher priority than the second uplink communication and based at least on determining that the total transmit power for the multiple uplink communications satisfies the maximum transmit power. In some aspects, the total scheduled transmit power includes a first scheduled transmit power for a first uplink communication, of the multiple uplink communications, and a second scheduled transmit power for a second uplink communication of the multiple uplink communications.

In some aspects, the UE may determine that the multiple uplink channels are to overlap on at least one orthogonal frequency division multiplexing (OFDM) symbol, and may determine that the multiple uplink channels are to be transmitted contemporaneously based at least in part on determining that the multiple uplink channels are to overlap on the at least one OFDM symbol. In some aspects, the set of priority rules identifies at least one of: a first respective priority associated with a physical random access channel (PRACH) communication associated with a primary cell (Pcell), a second respective priority associated with a physical uplink control channel (PUCCH) communication or a physical uplink shared channel (PUSCH) communication associated with an ultra-reliable low latency communication (URLLC) service, a third respective priority associated with the PUCCH communication or the PUSCH communication associated with an enhanced mobile broadband (eMBB) service, or a fourth respective priority associated with a sounding reference signal (SRS) or the PRACH communication associated with a cell other than the Pcell, wherein the first respective priority, the second respective priority, the third respective priority, and the fourth respective priority are different.

In some aspects, the set of priority rules identifies a set of sub-priorities for uplink communications associated with the second respective priority that comprises: a first sub-priority associated with the PUCCH communication associated with a scheduling request (SR), an acknowledgement (ACK), or a negative acknowledgement (NACK), or the PUSCH communication associated with the ACK, or the NACK, a second sub-priority associated with the PUCCH communication with channel state information (CSI), or the PUSCH communication with the CSI, or a third sub-priority associated with the PUSCH communication not associated with the ACK, the NACK, or the CSI, wherein the first sub-priority has a highest relative priority, the second sub-priority has a second highest relative priority, and the third sub-priority has a third highest relative priority.

In some aspects, the set of priority rules identifies a set of sub-priorities for uplink communications associated with the third respective priority that comprises: a first sub-priority associated with the PUCCH communication associated with a scheduling request (SR), an acknowledgement (ACK), or a negative acknowledgement (NACK), or the PUSCH communication associated with the ACK, or the NACK, a second sub-priority associated with the PUCCH communication with channel state information (CSI), or the PUSCH communication with the CSI, or a third sub-priority associated with the PUSCH communication not associated with the ACK, the NACK, or the CSI, wherein the first sub-priority has a highest relative priority, the second sub-priority has a second highest relative priority, and the third sub-priority has a third highest relative priority.

In some aspects, the set of priority rules identifies a higher priority for a first uplink communication, of the multiple uplink communications, than a second uplink communication, of the multiple uplink communications, based at least in part on the first uplink communication starting earlier in time than the second uplink communication, wherein a first respective transmit power for the first uplink communication is a first scheduled transmit power for the first uplink communication and a second respective transmit power for the second uplink communication does not exceed a difference between the maximum transmit power and the first scheduled transmit power for the first uplink communication. In some aspects, the UE may transmit a first uplink communication, of the multiple uplink communications, via a first set of antennas associated with the UE based at least in part on determining the respective transmit power of the first uplink communication and based at least in part on determining whether the power reduction is needed, and may transmit a second uplink communication, of the multiple uplink communications, via a second set of antennas associated with the UE based at least in part on determining the respective transmit power of the first uplink communication and based at least in part on determining whether the power reduction is needed, wherein the first set of antennas and the second set of antennas are different.

In some aspects, the multiple uplink communications includes at least two of: a physical uplink control channel (PUCCH) communication, a physical uplink shared channel (PUSCH) communication, a sounding reference signal (SRS), or a physical random access channel (PRACH) communication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
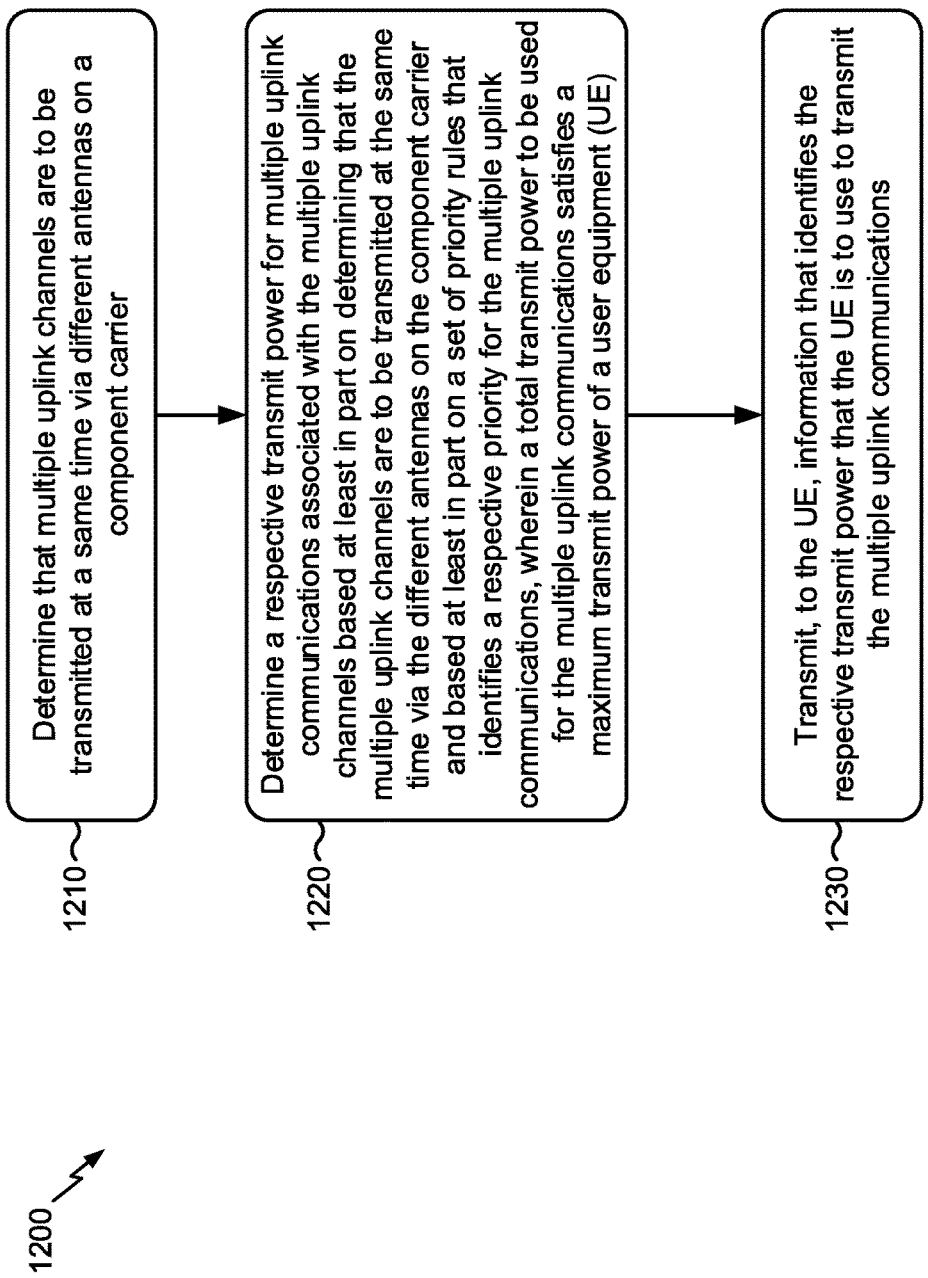
FIG. 12 is a diagram illustrating an example process performed, for example, by a base station, in accordance with the various aspects of the present disclosure.

FIG. 12 is a diagram illustrating an example process 1200 performed, for example, by a BS, in accordance with various aspects of the present disclosure. Example process 1200 is an example where a BS (e.g., BS 110) performs power control for spatial multiplexing of uplink channels based at least in part on a set of priority rules.

As shown in FIG. 12, in some aspects, process 1200 may include determining that multiple uplink channels are to be transmitted contemporaneously via different antennas on a component carrier (block 1210). For example, the BS (e.g., BS 110 using controller/processor 240 and/or the like) may determine that multiple uplink channels are to be transmitted contemporaneously via different antennas on a component carrier, as described elsewhere herein.

As further shown in FIG. 12, in some aspects, process 1200 may include determining a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, wherein a total transmit power to be used for the multiple uplink communications satisfies a maximum transmit power of a user equipment (UE) (block 1220). For example, the BS (e.g., BS 110 using controller/processor 240 and/or the like) may determine a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, as described elsewhere herein. In some aspects, a total transmit power to be used for the multiple uplink communications may satisfy a maximum transmit power of a user equipment (UE).

As further shown in FIG. 12, in some aspects, process 1200 may include determining whether a power reduction is needed for the respective transmit power based at least in part on determining the respective transmit power for the multiple uplink communications (block 1230). For example, the BS (e.g., BS 110 using controller/processor 240 and/or the like) may determine whether a power reduction is needed for the respective transmit power based at least in part on determining the respective transmit power for the multiple uplink communications, as described elsewhere herein.

As further shown in FIG. 12, in some aspects, process 1200 may include transmitting, to the UE, information that identifies the respective transmit power that the UE is to use to transmit the multiple uplink communications based at least in part on determining whether the power reduction is needed (block 1240). For example, the BS (e.g., BS 110 using controller/processor 240, transmit processor 220, TX MIMO processor 230, MOD 232, antenna 234, and/or the like) may transmit, to the UE, information that identifies the respective transmit power that the UE is to use to transmit the multiple uplink communications based at least in part on determining whether the power reduction is needed, as described elsewhere herein.

Process 1200 may include additional aspects, such as any single aspect or any combination of aspects described below and/or in connection with one or more other processes described elsewhere herein.

In some aspects, the BS may determine whether the power reduction is needed based at least in part on: a first uplink communication of the multiple uplink communications being a sounding reference signal (SRS), and a second uplink communication of the multiple uplink communications being a physical uplink shared channel (PUSCH) communication or a physical uplink control channel (PUCCH) communication. In some aspects, the BS may determine to reduce a first respective transmit power for the first uplink communication by a first threshold amount based at least in part on the first uplink communication including the SRS and the second uplink communication including the at least one of the PUSCH communication or the PUCCH communication, wherein the first threshold amount is based at least in part on a second respective transmit power for the second uplink communication.

In some aspects, the first threshold amount causes the second respective transmit power for the second uplink communication to exceed the first respective transmit power for the first uplink communication by at least a second threshold amount. In some aspects, the second threshold amount is based at least in part on: a quantity of overlapping resource elements between the first uplink communication and the second uplink communication relative to a total quantity of resources elements associated with the second uplink communication excluding a set of resource elements associated with a demodulation reference signal (DMRS) or a phase tracking reference signal (PTRS), a modulation and coding scheme (MCS) index or a quantity of transmission layers associated with the PUSCH communication when the second uplink communication includes the PUSCH communication, or a PUCCH format and an uplink control information (UCI) type associated with the PUCCH communication when the second uplink communication includes the PUCCH communication.

In some aspects, the BS may determine to reduce the first respective transmit power by the first threshold amount on a set of overlapping resource blocks associated with the first uplink communication and the second uplink communication and to not reduce the first respective transmit power for a set of non-overlapping resource blocks associated with the first uplink communication, or may determine to reduce the first respective transmit power by the first threshold amount on all resource blocks associated with the first uplink communication.

In some aspects, the BS may determine to reduce the first respective transmit power on all resource elements of a first channel associated with the first uplink communication or to reduce the first respective transmit power on the set of overlapping resource blocks and not on the set of non-overlapping resource blocks based at least in part on a quantity of overlapping resource elements between the first uplink communication and the second uplink communication relative to a total quantity of resources elements associated with the first uplink communication. In some aspects, the BS may transmit a semi-static configuration or a dynamic signal to cause the UE to transmit the multiple uplink communications using the respective transmit power based at least in part on determining whether the power reduction is needed.

In some aspects, the BS may transmit the information in association with a radio resource control (RRC) configuration based at least in part on determining whether the power reduction is needed. In some aspects, the BS may determine that a total scheduled or configured transmit power to be used for the multiple uplink communications does not satisfy the maximum transmit power of the UE. In some aspects, the UE may determine a scheduled transmit power as a first respective transmit power for a first uplink communication, of the multiple uplink communications, and a difference between the maximum transmit power of the UE and the first respective transmit power as a second transmit power for a second uplink communication, of the multiple uplink communications, based at least in part on determining that the first uplink communication has a higher priority than the second uplink communication and based at least in part on determining that the total transmit power for the multiple uplink communications satisfies the maximum transmit power.

In some aspects, the total scheduled or configured transmit power includes a first scheduled transmit power for a first uplink communication, of the multiple uplink communications, and a second scheduled transmit power for a second uplink communication of the multiple uplink communications. In some aspects, the BS may determine that the multiple uplink channels are to overlap on at least one orthogonal frequency division multiplexing (OFDM) symbol, and may determine that the multiple uplink channels are to be transmitted contemporaneously based at least in part on determining that the multiple uplink channels are to overlap on the at least one OFDM symbol.

In some aspects, the set of priority rules identifies at least one of: a first respective priority associated with a physical random access channel (PRACH) communication associated with a primary cell (Pcell), a second respective priority associated with a physical uplink control channel (PUCCH) communication or a physical uplink shared channel (PUSCH) communication associated with an ultra-reliable low latency communication (URLLC) service, a third respective priority associated with the PUCCH communication or the PUSCH communication associated with an enhanced mobile broadband (eMBB) service, or a fourth respective priority associated with a sounding reference signal (SRS) or the PRACH communication associated with a cell other than the Pcell, wherein the first respective priority, the second respective priority, the third respective priority, and the fourth respective priority are different. In some aspects, the set of priority rules identifies a set of sub-priorities for uplink communications associated with the second respective priority that comprises: a first sub-priority associated with the PUCCH communication associated with a scheduling request (SR), an acknowledgement (ACK), a negative acknowledgement (NACK), or the PUSCH communication associated with the ACK, or the NACK, or a second sub-priority associated with the PUCCH associated with channel state information (CSI), or the PUSCH communication associated with the CSI, or a third sub-priority associated with the PUSCH communication not associated with the ACK, the NACK, or the CSI, wherein the first sub-priority has a highest relative priority, the second sub-priority has a second highest relative priority, and the third sub-priority has a third highest relative priority.

In some aspects, the set of priority rules identifies a set of sub-priorities for uplink communications associated with the third respective priority that comprises: a first sub-priority associated with the PUCCH communication associated with a scheduling request (SR), an acknowledgement (ACK) or a negative acknowledgement (NACK), or the PUSCH communication associated with the ACK or the NACK, a second sub-priority associated with the PUCCH communication associated with channel state information (CSI), or the PUSCH communication associated with the CSI, or a third sub-priority associated with the PUSCH communication not associated with the ACK, the NACK, or the CSI, wherein the first sub-priority has a highest relative priority, the second sub-priority has a second highest relative priority, and the third sub-priority has a third highest relative priority.

In some aspects, the set of priority rules identifies a higher priority for a first uplink communication, of the multiple uplink communications, than a second uplink communication, of the multiple uplink communications, based at least in part on the first uplink communication having been scheduled to start earlier in time than the second uplink communication, wherein a first respective transmit power for the first uplink communication is a first scheduled transmit power for the first uplink communication and a second respective transmit power for the second uplink communication does not exceed a difference between the maximum transmit power and the first scheduled transmit power for the first uplink communication.

In some aspects, the BS may transmit the information to cause the UE to transmit a first uplink communication, of the multiple uplink communications, via a first set of antennas associated with the UE based at least in part on determining the respective transmit power of the first uplink communication and based at least in part on determining whether the power reduction is needed, and may transmit the information to cause the UE to transmit a second uplink communication, of the multiple uplink communications, via a second set of antennas associated with the UE based at least in part on determining the respective transmit power of the first uplink communication and based at least in part on determining whether the power reduction is needed, wherein the first set of antennas and the second set of antennas are different. In some aspects, the multiple uplink communications include at least two of: a physical uplink control channel (PUCCH) communication, a physical uplink shared channel (PUSCH) communication, a sounding reference signal (SRS), or a physical random access channel (PRACH) communication Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
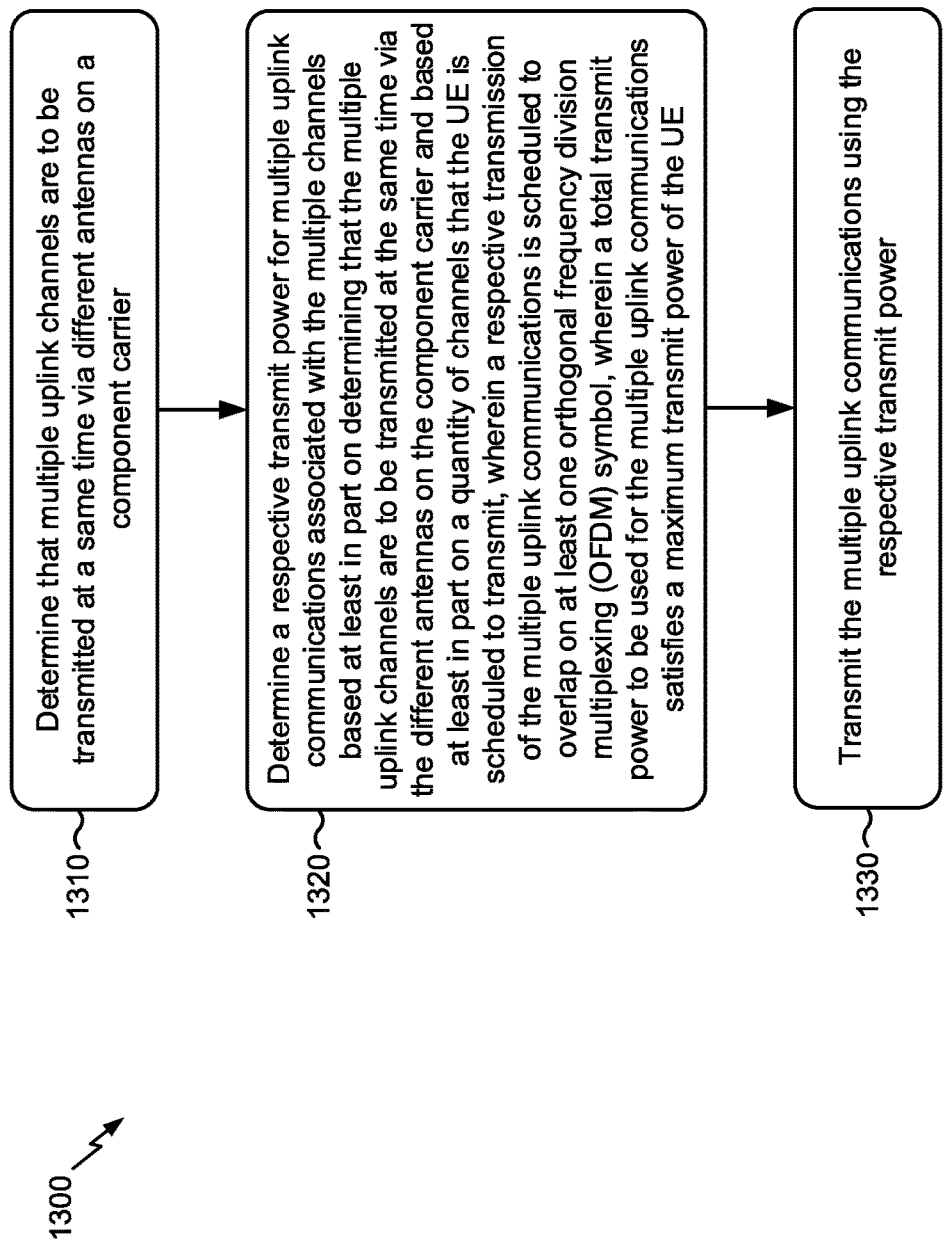
FIG. 13 is a diagram illustrating an example process performed, for example, by a user equipment, in accordance with various aspects of the present disclosure.

FIG. 13 is a diagram illustrating an example process 1300 performed, for example, by a UE, in accordance with various aspects of the present disclosure. Example process 1300 is an example where a UE (e.g., UE 120) performs power control for spatial multiplexing of uplink channels based at least in part on a quantity of channels configured and/or a quantity of channels scheduled.

As shown in FIG. 13, in some aspects, process 1300 may include determining that multiple uplink channels are to be transmitted contemporaneously via different antennas on a component carrier (block 1310). For example, the UE (e.g., UE 120 using controller/processor 280 and/or the like) may determine that multiple uplink channels are to be transmitted contemporaneously via different antennas on a component carrier, as described elsewhere herein.

As shown in FIG. 13, in some aspects, process 1300 may include determining a respective transmit power for multiple uplink communications associated with the multiple channels based at least in part on determining that the multiple uplink channels are to be transmitted contemporaneously via the different antennas on the component carrier and based at least in part on a quantity of channels that the UE is scheduled to transmit, wherein a respective transmission of the multiple uplink communications is scheduled to overlap on at least one orthogonal frequency division multiplexing (OFDM) symbol, wherein a total transmit power to be used for the multiple uplink communications satisfies a maximum transmit power of the UE (block 1320). For example, the UE (e.g., UE 120 using controller/processor 280 and/or the like) may determine a respective transmit power for multiple uplink communications associated with the multiple channels based at least in part on determining that the multiple uplink channels are to be transmitted contemporaneously via the different antennas on the component carrier and based at least in part on a quantity of channels that the UE is scheduled to transmit. In some aspects, a respective transmission of the multiple uplink communications may be scheduled to overlap on at least one orthogonal frequency division multiplexing (OFDM) symbol, as described elsewhere herein. In some aspects, a total transmit power to be used for the multiple uplink communications may satisfy a maximum transmit power of the UE.

As shown in FIG. 13, in some aspects, process 1300 may include transmitting the multiple uplink communications using the respective transmit power (block 1340). For example, the UE (e.g., UE 120 using controller/processor 280, transmit processor 264, TX MIMO processor 266, MOD 254, antenna 252, and/or the like) may transmit the multiple uplink communications using the respective transmit power, as described elsewhere herein.

Process 1300 may include additional aspects, such as any single aspect or any combination of aspects described below and/or in connection with one or more other processes described elsewhere herein.

In some aspects, the UE may determine a maximum value for the respective transmit power for the multiple uplink communications by dividing the maximum transmit power of the UE by the quantity of channels that the UE is scheduled to transmit simultaneously, wherein the multiple uplink communications have a same starting OFDM symbol. In some aspects, the UE may determine whether the power reduction is needed based at least in part on: a first uplink communication of the multiple uplink communications being a sounding reference signal (SRS), and a second uplink communication of the multiple uplink communications being a physical uplink shared channel (PUSCH) communication or a physical uplink control channel (PUCCH) communication.

In some aspects, the UE may determine to reduce a first respective transmit power for the first uplink communication by a first threshold amount based at least in part on the first uplink communication including the SRS and the second uplink communication including the at least one of the PUSCH communication or the PUCCH communication, wherein the first threshold amount is based at least in part on a second respective transmit power for the second uplink communication. In some aspects, the first threshold amount causes the second respective transmit power for the second uplink communication to exceed the first respective transmit power for the first uplink communication by at least a second threshold amount.

In some aspects, the second threshold amount is based at least in part on: a quantity of overlapping resource elements between the first uplink communication and the second uplink communication relative to a total quantity of resources elements associated with the second uplink communication excluding a set of resource elements associated with a demodulation reference signal (DMRS) or a phase tracking reference signal (PTRS), a modulation and coding scheme (MCS) index or a quantity of transmission layers associated with the PUSCH communication when the second uplink communication includes the PUSCH communication, or a PUCCH format and an uplink control information (UCI) type associated with the PUCCH communication when the second uplink communication includes the PUCCH communication. In some aspects, the UE may determine to reduce the first respective transmit power by the first threshold amount on a set of overlapping resource blocks associated with the first uplink communication and the second uplink communication and to not reduce the first respective transmit power for a set of non-overlapping resource blocks, or may determine to reduce the first respective transmit power by the first threshold amount on all resource blocks associated with the first uplink communication.

In some aspects, the UE may determine to reduce the first respective transmit power based at least in part on: a radio resource control (RRC) configuration received from a base station (BS), or a quantity of overlapping resource elements between the first uplink communication and the second uplink communication relative to a total quantity of resources elements associated with the first uplink communication. In some aspects, the UE may determine to reduce the first respective transmit power by the first threshold amount based at least in part on at least one of: a semi-static configuration from a base station (BS), a dynamic signal from the BS, or a determination by the UE. In some aspects, the UE may transmit a first uplink communication, of the multiple uplink communications, via a first set of one or more antennas associated with the UE, and may transmit a second uplink communication, of the multiple uplink communications, via a second set of one or more antennas associated with the UE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
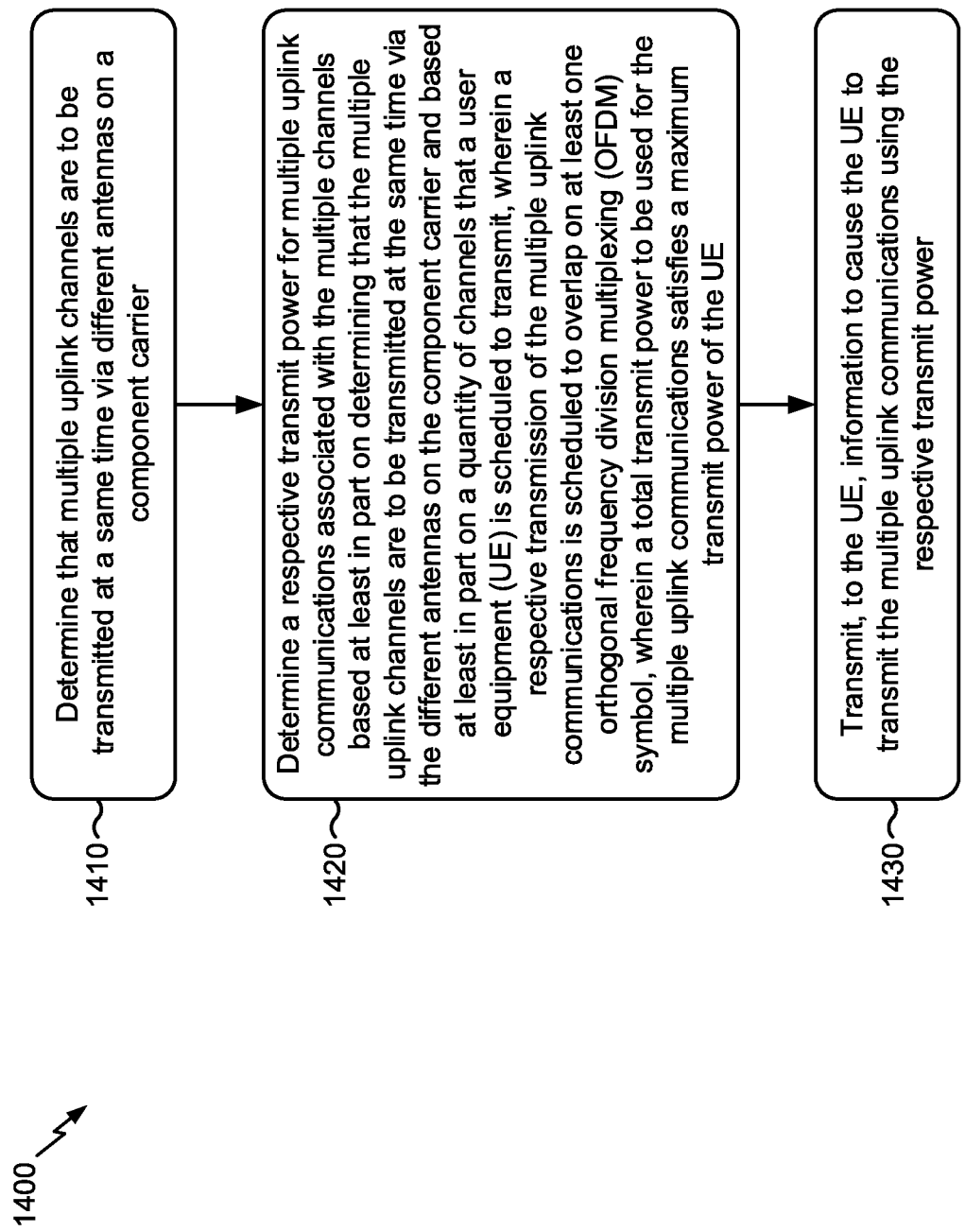
FIG. 14 is a diagram illustrating an example process performed, for example, by a base station, in accordance with the various aspects of the present disclosure.

FIG. 14 is a diagram illustrating an example process 1400 performed, for example, by a UE, in accordance with various aspects of the present disclosure. Example process 1400 is an example where a BS (e.g., BS 110) performs power control for spatial multiplexing of uplink channels based at least in part on a quantity of channels configured and/or a quantity of channels scheduled.

As shown in FIG. 14, in some aspects, process 1400 may include determining that multiple uplink channels are to be transmitted contemporaneously via different antennas on a component carrier (block 1410). For example, the BS (e.g., BS 110 using controller/processor 240 and/or the like) may determine that multiple uplink channels are to be transmitted contemporaneously via different antennas on a component carrier, as described elsewhere herein.

As shown in FIG. 14, in some aspects, process 1400 may include determining a respective transmit power for multiple uplink communications associated with the multiple channels based at least in part on determining that the multiple uplink channels are to be transmitted contemporaneously via the different antennas on the component carrier and based at least in part on a quantity of channels that a user equipment (UE) is scheduled to transmit, wherein a respective transmission of the multiple uplink communications is scheduled to overlap on at least one orthogonal frequency division multiplexing (OFDM) symbol, wherein a total transmit power to be used for the multiple uplink communications satisfies a maximum transmit power of the UE (block 1420). For example, the BS (e.g., BS 110 using controller/processor 240 and/or the like) may determine a respective transmit power for multiple uplink communications associated with the multiple channels based at least in part on determining that the multiple uplink channels are to be transmitted contemporaneously via the different antennas on the component carrier and based at least in part on a quantity of channels that a user equipment (UE) is scheduled to transmit. In some aspects, a respective transmission of the multiple uplink communications is scheduled to overlap on at least one orthogonal frequency division multiplexing (OFDM) symbol, as described elsewhere herein. In some aspects, a total transmit power to be used for the multiple uplink communications satisfies a maximum transmit power of the UE.

As shown in FIG. 14, in some aspects, process 1400 may include transmitting, to the UE, information to cause the UE to transmit the multiple uplink communications using the respective transmit power (block 1440). For example, the BS (e.g., BS 110 using controller/processor 240, transmit processor 220, TX MIMO processor 230, MOD 232, antenna 234, and/or the like) may transmit, to the UE, information to cause the UE to transmit the multiple uplink communications using the respective transmit power, as described elsewhere herein.

Process 1400 may include additional aspects, such as any single aspect or any combination of aspects described below and/or in connection with one or more other processes described elsewhere herein.

In some aspects, the BS may determine a maximum value for the respective transmit power for the multiple uplink communications by dividing the maximum transmit power of the UE by the quantity of channels that the UE is scheduled to transmit, wherein the multiple uplink communications have a same starting OFDM symbol, or may determine to prioritize a first uplink communication, of the multiple uplink communications, relative to a second uplink communication, of the multiple uplink communications, based at least in part on the first uplink communication starting at an earlier time than the second uplink communication, wherein the respective transmit power for the first uplink communication is a scheduled transmit power of the first uplink communication. In some aspects, the BS may determine whether the power reduction is needed based at least in part on: a first uplink communication of the multiple uplink communications being a sounding reference signal (SRS), and a second uplink communication of the multiple uplink communications being a physical uplink shared channel (PUSCH) communication or a physical uplink control channel (PUCCH) communication.

In some aspects, the BS may determine to reduce a first respective transmit power for the first uplink communication by a first threshold amount based at least in part on the first uplink communication including the SRS and the second uplink communication including the at least one of the PUSCH communication or the PUCCH communication, wherein the first threshold amount is based at least in part on a second respective transmit power for the second uplink communication. In some aspects, the first threshold amount causes the second respective transmit power for the second uplink communication to exceed the first respective transmit power for the first uplink communication by at least a second threshold amount.

In some aspects, the second threshold amount is based at least in part on: a quantity of overlapping resource elements between the first uplink communication and the second uplink communication relative to a total quantity of resources elements associated with the second uplink communication excluding a set of resource elements associated with a demodulation reference signal (DMRS) or a phase tracking reference signal (PTRS), a modulation and coding scheme (MCS) index or a quantity of transmission layers associated with the PUSCH communication when the second uplink communication includes the PUSCH communication, or a PUCCH format and an uplink control information (UCI) type associated with the PUCCH communication when the second uplink communication includes the PUCCH communication.

In some aspects, the BS may determine to reduce the first respective transmit power by the first threshold amount on a set of overlapping resource blocks associated with the first uplink communication and the second uplink communication and to not reduce the first respective transmit power for a set of non-overlapping resource blocks, or may determine to reduce the first respective transmit power by the first threshold amount on all resource blocks associated with the first uplink communication.

In some aspects, the BS may determine to reduce the first respective transmit power based at least in part on a quantity of overlapping resource elements between the first uplink communication and the second uplink communication relative to a total quantity of resources elements associated with the first uplink communication. In some aspects, the BS may transmit a semi-static configuration or a dynamic signal to cause the UE to transmit the multiple uplink communications using the respective transmit power based at least in part on determining whether the power reduction is needed.

In some aspects, the BS may transmit a radio resource control (RRC) configuration to cause the UE to transmit the multiple uplink communications using the respective transmit power based at least in part on determining whether the power reduction is needed. In some aspects, the BS may transmit the information to cause the UE to transmit a first uplink communication, of the multiple uplink communications, via a first antenna associated with the UE, and to transmit a second uplink communication, of the multiple uplink communications, via a second antenna associated with the UE.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of aspects. In fact, many of these features may be combined in ways not specifically recited in the claims and/or disclosed in the specification. Although each dependent claim listed below may directly depend on only one claim, the disclosure of aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that multiple uplink channels are to be transmitted contemporaneously via different antennas on a component carrier;
    determining a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications,
        wherein a total transmit power to be used for the multiple uplink communications satisfies a maximum transmit power of the UE; and
    transmitting the multiple uplink communications using the respective transmit power,
        wherein, in a symbol in which a first uplink communication and a second uplink communication of the multiple uplink communications do not overlap, the first uplink communication is transmitted using a scheduled transmit power, and
        wherein, in a symbol in which the first uplink communication and the second uplink communication overlap, the first uplink communication is transmitted using a first respective transmit power and the second uplink communication is transmitted using a second respective transmit power that is less than or equal to a difference between the maximum transmit power of the UE and the first respective transmit power.

2. The method of claim 1, wherein determining that the multiple uplink channels are to be transmitted contemporaneously via the different antennas on the component carrier comprises:
    determining that a total scheduled or configured transmit power to be used for the multiple uplink communications does not satisfy the maximum transmit power of the UE.

3. The method of claim 2, wherein the total scheduled or configured transmit power includes the scheduled transmit power and another scheduled transmit power for the second uplink communication.

4. The method of claim 2, wherein determining the respective transmit power for the multiple uplink communications comprises:
    determining the scheduled transmit power as the first respective transmit power and the difference between the maximum transmit power of the UE and the first respective transmit power as the second respective transmit power based at least in part on determining that the first uplink communication has a higher priority than the second uplink communication and based at least in part on determining that the total scheduled or configured transmit power does not satisfy the maximum transmit power.

5. The method of claim 1, further comprising:
    determining that the multiple uplink channels are to overlap on at least one orthogonal frequency division multiplexing (OFDM) symbol; and
    wherein determining that the multiple uplink channels are to be transmitted contemporaneously comprises:
        determining that the multiple uplink channels are to be transmitted contemporaneously based at least in part on determining that the multiple uplink channels are to overlap on the at least one OFDM symbol.

6. The method of claim 1, wherein the set of priority rules indicates the respective priority of the multiple uplink channels based at least in part on priorities of traffic conveyed in the multiple uplink channels.

7. The method of claim 6, wherein the set of priority rules identifies a set of priorities for the multiple uplink communications that comprises:

a first priority associated with:
- a physical uplink control channel (PUCCH) communication associated with a scheduling request (SR), an acknowledgement (ACK), or a negative acknowledgement (NACK), or
- a physical uplink shared channel (PUSCH) communication associated with the ACK, or the NACK, a second priority associated with the PUCCH communication with channel state information (CSI), or the PUSCH communication with the CSI, or a third priority associated with the PUSCH communication not associated with the ACK, the NACK, or the CSI,
  wherein the first priority has a highest relative priority, the second priority has a second highest relative priority, and the third priority has a third highest relative priority.

8. The method of claim 1, wherein the set of priority rules identifies a higher priority for the first uplink communication than the second uplink communication based at least in part on the first uplink communication starting earlier in time than the second uplink communication,
  wherein the first respective transmit power is the scheduled transmit power.

9. The method of claim 1, wherein, in the symbol in which the first uplink communication and the second uplink communication overlap, the first respective transmit power and the second respective transmit power are determined in accordance with the respective priority for the multiple uplink communications.

10. The method of claim 1, wherein transmitting the multiple uplink communications comprises:
  transmitting the first uplink communication via a first set of antennas associated with the UE based at least in part on determining the first respective transmit power, and
  transmitting the second uplink communication via a second set of antennas associated with the UE based at least in part on determining the second respective transmit power,
    wherein the first set of antennas and the second set of antennas are different.

11. The method of claim 1, further comprising:
  determining whether power reduction for the multiple uplink communications is needed based at least in part on:
    the first uplink communication being a sounding reference signal (SRS), and
    the second uplink communication being a physical uplink shared channel (PUSCH) communication or a physical uplink control channel (PUCCH) communication.

12. The method of claim 11, further comprising:
  determining to reduce the first respective transmit power by a first threshold amount based at least in part on the first uplink communication including the SRS and the second uplink communication including the at least one of the PUSCH communication or the PUCCH communication,
    wherein the first threshold amount is based at least in part on the second respective transmit power.

13. The method of claim 12, wherein the first threshold amount causes the second respective transmit power to exceed the first respective transmit power by at least a second threshold amount.

14. The method of claim 13, wherein the second threshold amount is based at least in part on:

a quantity of overlapping resource elements between the first uplink communication and the second uplink communication relative to a total quantity of resources elements associated with the second uplink communication excluding a set of resource elements associated with a demodulation reference signal (DMRS) or a phase tracking reference signal (PTRS), a modulation and coding scheme (MCS) index or a quantity of transmission layers associated with the PUSCH communication when the second uplink communication includes the PUSCH communication, or a PUCCH format and an uplink control information (UCI) type associated with the PUCCH communication when the second uplink communication includes the PUCCH communication.

15. The method of claim 12, wherein determining to reduce the first respective transmit power by the first threshold amount comprises:
  determining to reduce the first respective transmit power by the first threshold amount on a set of overlapping resource blocks associated with the first uplink communication and the second uplink communication and to not reduce the first respective transmit power for a set of non-overlapping resource blocks associated with the first uplink communication, or
  determining to reduce the first respective transmit power by the first threshold amount on all resource blocks associated with the first uplink communication.

16. The method of claim 15, wherein determining to reduce the first respective transmit power comprises:
  determining to reduce the first respective transmit power on all resource elements of a first channel associated with the first uplink communication or to reduce the first respective transmit power on the set of overlapping resource blocks and not on the set of non-overlapping resource blocks based at least in part on:
    a radio resource control (RRC) configuration received from a base station (BS), or
    a quantity of overlapping resource elements between the first uplink communication and the second uplink communication relative to a total quantity of resources elements associated with the first uplink communication.

17. The method of claim 12, wherein determining to reduce the first respective transmit power by the first threshold amount comprises:
  determining to reduce the first respective transmit power by the first threshold amount based at least in part on at least one of:
    a semi-static configuration from a base station (BS),
    a dynamic signal from the BS, or
    a determination by the UE.

18. The method of claim 1, further comprising:
  dropping another channel, other than the multiple uplink channels, that is scheduled contemporaneously with the multiple uplink channels based at least in part on the other channel having a lower priority than the multiple uplink channels.

19. The method of claim 1, further comprising:
  transmitting information indicating a capability of the UE; and
  receiving configuration information based at least in part on the capability, wherein the configuration information indicates a technique to be used to determine the respective transmit power.

20. The method of claim 1, wherein the multiple uplink communications include at least two of:

a physical uplink control channel (PUCCH) communication, a physical uplink shared channel (PUSCH) communication, a sounding reference signal (SRS), or a physical random access channel (PRACH) communication.

21. A method of wireless communication performed by a base station (BS), comprising:

determining that multiple uplink channels are to be transmitted contemporaneously via different antennas on a component carrier;

determining a respective transmit power for multiple uplink communications associated with the multiple uplink channels based at least in part on determining that the multiple uplink channels are to be transmitted contemporaneously via the different antennas on the component carrier and based at least in part on a set of priority rules that identifies a respective priority for the multiple uplink communications, wherein a total transmit power to be used for the multiple uplink communications satisfies a maximum transmit power of a user equipment (UE); and transmitting, to the UE, information that identifies the respective transmit power that the UE is to use to transmit the multiple uplink communications, wherein, in a symbol in which a first uplink communication and a second uplink communication of the multiple uplink communications do not overlap, the first uplink communication is transmitted using a scheduled transmit power, and wherein, in a symbol in which the first uplink communication and the second uplink communication overlap, the first uplink communication is transmitted using a first respective transmit power and the second uplink communication is transmitted using a second respective transmit power that is less than or equal to a difference between the maximum transmit power of the UE and the first respective transmit power.

22. A method of wireless communication performed by a user equipment (UE), comprising:

determining that multiple uplink channels are to be transmitted contemporaneously via different antennas on a component carrier;

determining a respective transmit power for multiple uplink communications associated with the multiple uplink channels based at least in part on determining that the multiple uplink channels are to be transmitted contemporaneously via the different antennas on the component carrier and based at least in part on a quantity of channels that the UE is scheduled to transmit, wherein a respective transmission of the multiple uplink communications is scheduled to overlap on at least one orthogonal frequency division multiplexing (OFDM) symbol, and wherein a total transmit power to be used for the multiple uplink communications satisfies a maximum transmit power of the UE;

transmitting the multiple uplink communications using the respective transmit power, wherein, in a first OFDM symbol in which a first uplink communication and a second uplink communication of the multiple uplink communications do not overlap, the first uplink communication is transmitted using a scheduled transmit power, and wherein, in a second OFDM symbol in which the first uplink communication and the second uplink communication overlap, the first uplink communication is transmitted using a first respective transmit power and the second uplink communication is transmitted using a second respective transmit power that is less than or equal to a difference between the maximum transmit power of the UE and the first respective transmit power.

23. The method of claim 22, further comprising:

determining a maximum value for the respective transmit power for the multiple uplink communications by dividing the maximum transmit power of the UE by the quantity of channels that the UE is scheduled to transmit simultaneously, wherein the multiple uplink communications have a same starting OFDM symbol.

24. The method of claim 22, further comprising:

determining whether a power reduction is needed based at least in part on:

the first uplink communication being a sounding reference signal (SRS), and the second uplink communication being a physical uplink shared channel (PUSCH) communication or a physical uplink control channel (PUCCH) communication.

25. The method of claim 22, wherein the respective transmit power of the multiple uplink communications is based at least in part on a respective number of antennas, of the different antennas, on which the multiple uplink communications are transmitted, wherein the maximum transmit power of the UE is equally distributed across the different antennas, and wherein a maximum power for an uplink channel, of the multiple uplink channels, is based at least in part on a number of antennas for the uplink channel and a maximum power per antenna of the different antennas.

26. The method of claim 22, further comprising:

dropping another channel, other than the multiple uplink channels, that is scheduled contemporaneously with the multiple uplink channels based at least in part on the other channel having a lower priority than the multiple uplink channels.

27. The method of claim 22, further comprising:

transmitting information indicating a capability of the UE; and receiving configuration information based at least in part on the capability, wherein the configuration information indicates a technique to be used to determine the respective transmit power.

28. The method of claim 22, wherein transmitting the multiple uplink communications comprises:

transmitting the first uplink communication via a first set of one or more antennas associated with the UE; and transmitting the second uplink communication via a second set of one or more antennas associated with the UE.

29. A method of wireless communication performed by a base station (BS), comprising:

determining that multiple uplink channels are to be transmitted contemporaneously via different antennas on a component carrier;

determining a respective transmit power for multiple uplink communications associated with the multiple uplink channels based at least in part on determining that the multiple uplink channels are to be transmitted contemporaneously via the different antennas on the component carrier and based at least in part on a quantity of channels that a user equipment (UE) is scheduled to transmit,
  wherein a respective transmission of the multiple uplink communications is scheduled to overlap on at least one orthogonal frequency division multiplexing (OFDM) symbol,
  wherein a total transmit power to be used for the multiple uplink communications satisfies a maximum transmit power of the UE; and
transmitting, to the UE, information to cause the UE to transmit the multiple uplink communications using the respective transmit power,
  wherein, in a first OFDM symbol in which a first uplink communication and a second uplink communication of the multiple uplink communications do not overlap, the first uplink communication is transmitted using a scheduled transmit power, and
  wherein, in a second OFDM symbol in which the first uplink communication and the second uplink communication overlap, the first uplink communication is transmitted using a first respective transmit power and the second uplink communication is transmitted using a second respective transmit power that is less than or equal to a difference between the maximum transmit power of the UE and the first respective transmit power.

30. The method of claim 29, wherein determining the respective transmit power for the multiple uplink communications comprises:
  determining a maximum value for the respective transmit power for the multiple uplink communications by dividing the maximum transmit power of the UE by the quantity of channels that the UE is scheduled to transmit,
    wherein the multiple uplink communications have a same starting OFDM symbol, or
  determining to prioritize the first uplink communication relative to the second uplink communication based on the first uplink communication starting at an earlier time than the second uplink communication,
    wherein the first respective transmit power is the scheduled transmit power.

\* \* \* \* \*